United States Patent [19]

Lanter

[11] Patent Number: 5,193,185
[45] Date of Patent: Mar. 9, 1993

[54] METHOD AND MEANS FOR LINEAGE TRACING OF A SPATIAL INFORMATION PROCESSING AND DATABASE SYSTEM

[76] Inventor: David Lanter, 140 Westport Dr., Columbia, S.C. 29223

[21] Appl. No.: 351,877

[22] Filed: May 15, 1989

[51] Int. Cl.$^5$ .......................................... G06F 15/40
[52] U.S. Cl. ........................... 395/600; 364/DIG. 1; 364/282.1; 364/283.4; 364/282.2; 364/280; 364/274.5; 364/274.1
[58] Field of Search ............... 364/200, 900; 395/700, 395/600

[56] References Cited

U.S. PATENT DOCUMENTS

| | | | |
|---|---|---|---|
| 4,318,184 | 3/1982 | Millett et al. | 364/900 |
| 4,370,707 | 1/1983 | Phillips et al. | 364/200 |
| 4,408,273 | 10/1983 | Plow | 364/200 |
| 4,479,196 | 10/1984 | Ferrer et al. | 364/900 |
| 4,558,413 | 12/1985 | Schmidt et al. | 364/300 |
| 4,611,298 | 9/1986 | Schuldt | 364/900 |
| 4,714,992 | 12/1987 | Gladney et al. | 364/200 |
| 4,751,635 | 6/1988 | Kret | 364/200 |
| 4,791,550 | 12/1988 | Stevenson et al. | 364/200 |
| 4,868,733 | 9/1989 | Fujisawa et al. | 364/200 |

OTHER PUBLICATIONS

Allman, Eric, "An Introduction to the Service Code Control Septrum," University of California at Berkeley, pp. 1-14, 1980.
Allder, William R. and Aiep A. Elossal, U.S. Geological Survey, Circular 895-C, *USGS Digital Cartographic Data Standards*, 1984.
Aronson, Peter and Scott Morehouse 1984, "The ARC-/INFO Map Library: A Decision for a Digital Geogrphic Database", *Proceedings of the Sixth Internatinal Symposium on Automated Cartography*, pp. 372-382.
Buchanan, Bruce G. and E. H. Shortlifte, 1985, *Role Based Expert Systems*, Addison-Wesley Publishing Company, Reading, Mass.
Charniak, Eugine et al. 1987, *Artificial Intelligence Porgramming*, Lawrence Erlbaum Associates, Hillsdale, N.J.
Clarke, Keith C. 1986, "Advance in Geographic Information Systems", *Compu. Environ. Urban Systems*, vol. 10, No. 3/4, pp. 175-184.
Cowen, David J. 1988, "GIS vs. CAS vs. DBMS: What are the Differences?", *Photogrammetric Engineering and Remote Sensing*, vol. 54, No. 11, pp. 1551-1555.
Deuker, Kenneth J. 1987, "Geographic Information Systems and Computer-Aided Mapping", *APA Journal* Summer.
Fiedler, David and Bruce H. Hunter 1986, *UNIX System Administration*, Hayden Book Company, Hasbrouck Heights, N.J., p. 58.

(List continued on next page.)

*Primary Examiner*—Kevin A. Kriess
*Attorney, Agent, or Firm*—Jon L. Roberts

[57] ABSTRACT

A lineage information processor enables a user to obtain information concerning the various data layers in a spatial data base which contributed to any particular data layer of interest. The component software parses input commands and determines if those commands to the spatial data processing and information systems are valid. The lineage information processor also creates a knowledge representation of the spatial database comprising a meta-database consisting of a semantic network that describes the various data layers in the spatial database and the relationships among these layers. The semantic network consists of parent and child links symbolizing the relationship among data layers, nodes describing the data layers in the spatial database, frames comprising attributes that describe the input data layers, the commands and command modifiers acting on those data layers, and characteristics of the final products. By means of rule-based processing, the lineage information processor does not permit combinations of data layers that are incompatible, and creates commands that can alter incompatible data layers so that the layers can be combined in the desired fashion. A query capability is also provided that enables a user to query in a flexible fashion, the lineage information processor concerning the lineage of data layers in the spatial database.

22 Claims, 68 Drawing Sheets

OTHER PUBLICATIONS

ERDAS 1985 *ERDAS Users Manual Revision 7.2*, ERDAS Inc., Atlanta, Ga.

Jones, Mary K. et al. 1986 *A Feasibility Analysis of Geographic Information Systems for The Commonwealth of Massachusetts Hazardous Waste Facility Site*. Safety Council: Final Report, Databasics, Inc., Providence, RI.

Kinzer, Don and Richard Kinnaird 1987, *Polytron Version Control System User's Manual*, Polytron Corporation, Beaverton, Ore.

Langran, Gail 1988, "Temporal GIS Design Tradeoffs", *GIS/LIS '88 Proceedings*, vol. 2, 890–899.

Langran, Gail and N. R. Chrisman 1988, "A Framework for Technical Geographic Information", Submitted to *Cartographica*—unpublished.

Marx, Robert W. 1986, "The Tiger System: Automating the Georgraphic Structure of the United States Census" *Government Publications Review*, vol. 13, pp. 184–201.

McKeown, David M. Jr. 1987, "The Role Artificial Intelligence in the Integration of Remotely Sensed Data with Geographic Information Systems", *IEEE Transactions on Geoscience and Remote Sensing*, vol. GE-25, No. 3, pp. 330–347.

Peuker, Thomas K. and Nicholas Chrisman 1975, "Cartographic Data Structures", *The American Cartographer*, vol. 2, No. 1, pp. 55–69.

Steele, Guy L. Jr., *Common LISP: The Language*, Digital Press, 1984.

Tomlin, Charles Data 1983, "Digital Cartographic Modeling Techniques in Environmental Planning", Dissertation, Yale University.

```
SOURCE DESCRIPTION FRAME

NAME:        _____

FEATURES:    _____

DATE:        _____

AGENCY:      _____

SCALE:       _____

PROJECTION:  _____

ACCURACY:    _____
```

Figure 3

IMAGE PROCESSING SOURCE DESCRIPTION FRAME

IMAGE I.D.: _____

SENSOR: _____

SPECTRAL BANDS: _____

DATE: _____

TIME: _____

LOCATION: _____

CLOUD COVER: _____

ANGLE OF VIEW: _____

FORMAT: _____

DISTRIBUTING AGENCY: _____

Figure 4

```
COMMAND FRAME

NAME:        _____

MODIFIER:    _____

VALUE:       _____

DATE/TIME:   _____
```

Figure 5

```
PRODUCT FRAME

PRODUCT:         _____
USE:             _____
USERS:           _____
RESPONSIBILITY:  _____
P_DATE:          _____
```

Figure 6

| LEFT HAND SIDE (IF) | : | RIGHT HAND SIDE (THEN) |
| --- | --- | --- |
| | : | |
| scale MAP1 = scale MAP2 and | : | |
| projection MAP1 = projection MAP2 | : | |
| | : | then overlay MAP1 MAP2 |

Figure 19

```
Rule 1:
if (command = overlay MAP1 and MAP2) and
    if (scale of MAP1 = scale of MAP2) and
    if (projection of MAP1 = projection of MAP2)
  then
    execute overlay of MAP1 and MAP2 for MAP3

Rule 2:
    if (command = overlay MAP1 and MAP2) and
    if (scale of MAP1 <> scale of MAP2) and
    if (MAP1 = BaseMap)
  then
        execute a rescale of MAP2 to scale of MAP1

Rule 3:
if (command = overlay MAP1 and MAP2) and
    if (projection of MAP1 <> projection of MAP2) and
    if (MAP1 = BaseMap)
  then
    execute a inverse projection of MAP2
    execute a projection of MAP2 to MAP1's projection
```

Figure 20

RESTRICTION ON COMMANDS

PERMIT PROCESSING

```
(defun match (p s)
    (cond ((null p) (null s))
          ((atom (car p))
           (and s
                (equal (car p) (car s))
                (match (cdr p) (cdr s))))
          ((and s
                (eq (caar p) '?))
           (cond ((match (cdr p) (cdr s))
                  (set (cadar p) (car s)) t)
                 (t nil)))
          ((and s
                (apply (caar p) (list (car s)))
                (match (cdr p) (cdr s)))
           (set (cadar p) (car s)) t)

(t nil)))
```

MATCH, A recursive pattern-matching function. Input argument p is the template. Input argument s is the user's commad line input.

Figure 28

```
(match '(drain (? inmap) over (? inmap2) for (? outmap))
            text)
```

The MATCH function is passed the command template for DRAIN and the user's command line input which is bound to 'text'.

Figure 29

```
(defun addparent (aname x)
     (putprop aname (addtoset x (get aname 'parent))
          'parent))

(defun addchild (aname x)
     (putprop aname (addtoset x (get aname 'child))
          'child))

(defun putprop (atom_name value prop_name)
     (setf (get atom_name prop_name) value))

(defun addtoset (elt lst)

(cond ((member elt lst) lst)
      (t (cons elt lst))))
```

Semantic network functions for creating parent/child relationships between layers.

Figure 30

SOURCE DESCRIPTION FRAME

SOURCE: Digital line graph

FEATURES: Hydrography

S_DATE: 4/7/83

AGENCY: USGS

SCALE: 1:100,000

PROJECTION: Mercator

ACCURACY: +-10 meters Horiz

Figure 32

```
(fput outmap 'source      'value 'Digital_Line_Graph)
(fput outmap 'features    'value 'Hydrography)
(fput outmap 'S_date      'value '4/7/83)
(fput outmap 'agency      'value 'USGS)
(fput outmap 'scale       'value '1:100,000)
(fput outmap 'projection  'value 'Mercator)
(fput outmap 'accuracy    'value '+-10meters_horizontal)
```

Figure 33

COMMAND FRAME

COMMAND:   Renumber

ASSIGN:    3

TO:        1

THROUGH:   9

C_DATE:    3/7/88

Figure 34

```
(fput outmap 'command    'value 'renumber)
(fput outmap 'assign     'value assign_value)
(fput outmap 'to         'value to_value)
(fput outmap 'through    'value through_value)
(fput outmap 'C_Date     'value '3/7/88)
```

Figure 35

PRODUCT FRAME

PRODUCT:       Map 3 Block Island

USE:           Wrecks on Shoals 1987

USERS:         Coast Guard Patrol

RESPONSIBILITY: Capt. Bob

P_DATE:        3/11/88

Figure 36

```
(fput outmap 'Product        'value 'Map3_Block_Island)
(fput outmap 'Use            'value 'Wrecks_on_Shoals_1987)
(fput outmap 'Users          'value 'Coast_Guard_Patrol)
(fput outmap 'Responsibility 'value 'Capt._Bob)
(fput outmap 'P_Date         'value '3/11/88)
```

Figure 37

Designate one application to be dominant and the rest
will be subordiate. For each subordinate layer:
    Starting with the final product of the dominant
    application, visit every ancestral layer in turn
    until all original inputs are visited, make this
    layer D_LAYER:
        Starting with the final product of the
        subordinate application, visit every ancestral
        layer making this S_LAYER, while S_LAYER =
        D_LAYER:
            Make new parent pointers for D_LAYER point
            to the same layers that S_LAYER's parent
            pointers point to:
                * Get S_LAYER's parent pointers. This
                  will get a list of S_LAYER's children.
                * For each of S_LAYER's children make
                  D_LAYER the parent of S_LAYER's children.
            Make all child pointers pointing to S_LAYER
            point to D_LAYER:
                * Get S_LAYER's parent pointers. This
                  will get a list of S_LAYER's children.
                * For each of S_LAYER's children make
                  D_LAYER point to S_LAYER's children.
            Remove S_LAYER from the knowledge representation:
                * Get S_LAYER's parent pointers. This
                  will get a list of S_LAYER's children.
                * For each of S_LAYER's children
                  remove each of the child pointers
                  pointing to S_LAYER.
                * Remove all of S_LAYER's parent pointers.

Figure 38

```
((match '(What is (? x)) text)
    (setq isaflag nil)
    (setq includeflag nil)
    (cond((setq y (get x 'parent))
        (setq isaflag t))
      ((setq y (get x 'child))
        (setq includeflag t)))
    (print
    (append
        (list x)
        (cond (isaflag '(is a child of))
            (includeflag
                '(results from)))
        (makeconj y))))
```

Figure 39

(what is landuse)

(LANDUSE IS A PARENT OF WETUSE)

Figure 40

```
((match '( Is (? map1) a parent of (? map2))
      text)
 (cond ((isatest map1 map2 10)
     (print
         (append '(yes indeed)
                (list map1)
              '(is a parent of)
                (list map2))))
     (t (print '(Sorry not that I know of)))))
```

Figure 41

(Is landuse a parent of counsens)

(YES INDEED LANDUSE IS A PARENT OF COUNSENS)

Figure 42

```
((match '(What is the lineage of (? map))
          text)
         (ancestors map))

; This returns the lineage of a particular map layer.

(defun ancestors (map)
    (cond ((null map) nil)
          ((null (fget map 'command 'value))
               (print (append (list map)
                       '(is an original map layer)
(terpri))))
          (t (print (append '(Input to)
                    (list map)
                    '(is)
                    (get map 'child)
                    '( Command is)
                    (fget map 'command 'value)
                    (terpri)))
        (cond((null (cdr (get map 'child)))
                (ancestors (car (get map 'child))))
              (t (ancestors (car (get map 'child)))
                 (ancestors (cadr (get map 'child)))))))))
```

Figure 43

(I UNDERSTAND) (what is the lineage of counsens)

(INPUT TO COUNSENS IS COUNTY ADRADMAP1 COMMAND IS MULTIPLY)

(COUNTY IS AN ORIGINAL MAP LAYER)

(INPUT TO ADRADMAP1 IS ADRADMAP COMMAND IS RENUMBER)

(INPUT TO ADRAPMAP IS RAD2MAP RAD1MAP COMMAND IS ADD)

(INPUT TO RAD2MAP IS WETUSE COMMAND IS RADIATE)

(INPUT TO WETUSE IS LANDUSE COMMAND IS RENUMBER)

(LANDUSE IS AN ORIGINAL MAP LAYER)

(INPUT TO RAD1MAP IS WETUSE COMMAND IS RADIATE)

(INPUT TO WETUSE IS LANDUSE COMMAND IS RENUMBER)

(LANDISE IS AN ORIGINAL MAP LAYER)

Figure 44

```
((match '(why is (? map1) a parent of (? map2))
      text)
 (cond ((isatest map1 map2  10)
      (print (cons 'Because
               (explain_links map1 map2))))
         (t (print '(But it is not!)))))
(t (print '(I do not understand)))))
```

Figure 45

(why is landuse a parent of counsens)

(BECAUSE LANDUSE IS A PARENT OF WETUSE WETUSE IS A PARENT OF RAD2MAP RAD2MAP IS A PARENT OF ADRADMAP ADRADMAP IS A PARENT OF ADRADMAP1 AND ADRADMAP1 IS A PARENT OF COUNSENS)

Figure 46

```
((match '(what are the final products of (?X))
 (descendents x)) text)

(defun decendents (map)
    (cond ((null map) nil)
          ((null (car (get map 'parent)))
              (print (append (list map)
                     (is a product map layer) (terpri))))
       (t
          (cond((null (cdr (get map 'parent)))
                   (decendents (car (get map 'parent))))
               (t (decendents (car (get map 'parent)))
                  (decendents (cadr (get map 'parent)))))))))
```

Figure 47

(what are the final products of landuse)

(COUNSENS IS A PRODUCT MAP LAYER)

Figure 48

```
; TOP LEVEL PROCEDURE
; An example of a system for creating and manipulating a lineage
; meta-database composed of a semantic net to store information
; concerning relationships between GIS layers, and frames for
; storing attributes of layers and GIS commands.

(defun geo_lineus ()
     (prog ()
           (princ "I am Geo_Lineus ")
           (terpri)
           (princ "Please give me information or ask questions: ")
     loop (setq textin (read-line))
           (setq textin2 (new-input textin))
           (interpret textin2)
           (go loop)))
;****************************************************************
; PRODUCTION RULES
;
(defun interpret (text)

;Begin New Layer
Creation.................................................
;Begin Import
     (cond ((match '(import cover (? inmap) (? outmap))
                  text)
           (terpri)
           (princ "What is the source name? ")
           (setq textin2 (new-input (read-line)))
           (terpri)
           (fput outmap 'SDF 'name textin2)
           (princ "Containing what cartographic features? ")
           (setq textin2 (new-input (read-line)))
           (terpri)
           (fput outmap 'SDF 'features textin2)
           (princ "What is the source date? ")
           (setq textin2 (new-input (read-line)))
           (terpri)
           (fput outmap 'SDF 'date textin2)
           (princ "What is the source Agency? ")
           (setq textin2 (new-input (read-line)))
```

Figure 49

APPLICATION NO: 07/351,877
GROUP ART UNIT: 237

```
          (terpri)
          (fput outmap 'SDF 'agency textin2)
          (princ "What is the source scale? ")
          (setq textin2 (new-input (read-line)))
          (terpri)
          (fput outmap 'SDF 'scale textin2)
          (princ "What is the source projection? ")
          (setq textin2 (new-input (read-line)))
          (terpri)
          (fput outmap 'SDF 'projection textin2)
          (princ "What is the source accuracy? ")
          (setq textin2 (new-input (read-line)))
          (terpri)
          (fput outmap 'SDF 'accuracy textin2)
          (princ "Thank You! "))
;End Import ;Begin Export
          ((match '(export cover (? inmap) (? outmap))
                  text)
          (terpri)
          (princ "What is the product's name? ")
          (setq textin2 (new-input (read-line)))
          (fput inmap 'PF 'name textin2)
          (terpri)
          (princ "What is the product's use? ")
          (setq textin2 (new-input (read-line)))
          (fput inmap 'PF 'use textin2)
          (terpri)
          (princ "Who are the product's users? ")
          (setq textin2 (new-input (read-line)))
          (fput inmap 'PF 'users textin2)
          (terpri)
          (princ "Who is responsible for the product? ")
          (setq textin2 (new-input (read-line)))
          (fput inmap 'PF 'responsibility textin2)
          (terpri)
          (princ "What is the product's release date? ")
          (setq textin2 (new-input (read-line)))
          (fput inmap 'PF 'p_date textin2)
          (terpri)
```

Figure 49A

```
                (princ "Thank You! "))
;End Export

;Begin Renumber
        ((match '(renumber (? inmap) assigning (? assign_value)
                    to (? to_value) through (? through_value)
                    for (? outmap))
            text)
        (addparent inmap outmap)
        (addchild outmap inmap)
        (fput outmap 'command 'value 'renumber)
        (fput outmap 'assign 'value assign_value)
        (fput outmap 'to 'value to_value)
        (fput outmap 'through 'value through_value)
        (print '(I understand)))

((match '(renumber (? inmap) assigning (? assign_value1)
                    to (? to_value1) through (? through_value1)
                    assigning (? assign_value2)
                    to (? to_value2) through (? through_value2)
                    for (? outmap))
            text)
        (addparent inmap outmap)
        (addchild outmap inmap)
        (fput outmap 'command 'value 'renumber)
        (fput outmap 'assign 'value assign_value1)
        (fput outmap 'to 'value to_value1)
        (fput outmap 'through 'value through_value1)
        (fput outmap 'assign2 'value assign_value2)
        (fput outmap 'to2 'value to_value2)
        (fput outmap 'through2 'value through_value2)
        (print '(I understand)))

((match '(renumber (? inmap) assigning (? assign_value1)
                    to (? to_value1)
                    assigning (? assign_value2)
                    to (? to_value2) through (? through_value2)
                    for (? outmap))
            text)
        (addparent inmap outmap)
        (addchild outmap inmap)
```

Figure 49B

```
(fput outmap 'command 'value 'renumber)
(fput outmap 'assign 'value assign_value1)
(fput outmap 'to 'value to_value1)
(fput outmap 'assign2 'value assign_value2)
(fput outmap 'to2 'value to_value2)
(fput outmap 'through2 'value through_value2)
(print '(I understand)))

((match '(renumber (? inmap) assigning (? assign_value1)
          to (? to_value1) through (? through_value1)
          assigning (? assign_value2)
          to (? to_value2) for (? outmap))
    text)
(addparent inmap outmap)
(addchild outmap inmap)
(fput outmap 'command 'value 'renumber)
(fput outmap 'assign 'value assign_value1)
(fput outmap 'to 'value to_value1)
(fput outmap 'through 'value through_value1)
(fput outmap 'assign2 'value assign_value2)
(fput outmap 'to2 'value to_value2)
(print '(I understand)))

((match '(renumber (? inmap) assigning (? assign_value1)
          to (? to_value1) through (? through_value1)
          assigning (? assign_value2)
          to (? to_value2) through (? through_value2)
          assigning (? assign_value3)
          to (? to_value3) through (? through_value3)
          for (? outmap))
    text)
(addparent inmap outmap)
(addchild outmap inmap)
(fput outmap 'command 'value 'renumber)
(fput outmap 'assign 'value assign_value1)
(fput outmap 'to 'value to_value1)
(fput outmap 'through 'value through_value1)
(fput outmap 'assign2 'value assign_value2)
(fput outmap 'to2 'value to_value2)
(fput outmap 'through2 'value through_value2)
(fput outmap 'assign3 'value assign_value3)
```

Figure 49C

```
    (fput outmap 'to3 'value to_value3)
    (fput outmap 'through3 'value through_value3)
    (print '(I understand))))

((match '(renumber (? inmap) assigning (? assign_value1)
            to (? to_value1) through (? through_value1)
            assigning (? assign_value2)
            to (? to_value2) through (? through_value2)
            assigning (? assign_value3) to (? to_value3)
            for (? outmap))
        text)
    (addparent inmap outmap)
    (addchild outmap inmap)
    (fput outmap 'command 'value 'renumber)
    (fput outmap 'assign 'value assign_value1)
    (fput outmap 'to 'value to_value1)
    (fput outmap 'through 'value through_value1)
    (fput outmap 'assign2 'value assign_value2)
    (fput outmap 'to2 'value to_value2)
    (fput outmap 'through2 'value through_value2)
    (fput outmap 'assign3 'value assign_value3)
    (fput outmap 'to3 'value to_value3)
    (print '(I understand)))

((match '(renumber (? inmap) assigning (? assign_value1)
            to (? to_value1) assigning (? assign_value2)
            to (? to_value2) assigning (? assign_value3)
            to (? to_value3) through (? through_value3)
            for (? outmap))
        text)
    (addparent inmap outmap)
    (addchild outmap inmap)
    (fput outmap 'command 'value 'renumber)
    (fput outmap 'assign 'value assign_value1)
    (fput outmap 'to 'value to_value1)
    (fput outmap 'assign2 'value assign_value2)
    (fput outmap 'to2 'value to_value2)
    (fput outmap 'assign3 'value assign_value3)
    (fput outmap 'to3 'value to_value3)
    (fput outmap 'through3 'value through_value3)
    (print '(I understand))))
```

Figure 49D

```
((match '(renumber (? inmap) assigning (? assign_value)
          to (? to_value)
          for (? outmap))
       text)
 (addparent inmap outmap)
 (addchild outmap inmap)
 (fput outmap 'command 'value 'renumber)
 (fput outmap 'assign 'value assign_value)
 (fput outmap 'to 'value to_value)
 (print '(I understand)))

((match '(renumber (? inmap) assigning (? assign_value1)
          to (? to_value1) assigning (? assign_value2)
          to (? to_value2)
          for (? outmap))
       text)
 (addparent inmap outmap)
 (addchild outmap inmap)
 (fput outmap 'command 'value 'renumber)
 (fput outmap 'assign 'value assign_value1)
 (fput outmap 'to 'value to_value1)
 (fput outmap 'assign 'value assign_value2)
 (fput outmap 'to 'value to_value2)
 (print '(I understand)))

((match '(renumber (? inmap) assigning (? assign_value)
          to (? to_value) through (? through_value))
       text)
 (addparent inmap 'x)
 (addchild 'x inmap)
 (fput 'x 'command 'value 'renumber)
 (fput 'x 'assign 'value assign_value)
 (fput 'x 'to 'value to_value)
 (fput 'x 'through 'value through_value)
 (print '(I understand)))

((match '(renumber (? inmap) assigning (? assign_value)
          to (? to_value))
       text)
 (addparent inmap 'x)
 (addchild 'x inmap)
```

Figure 49E

```
            (fput 'x 'command 'value 'renumber)
            (fput 'x 'assign 'value assign_value)
            (fput 'x 'to 'value to_value)
            (print '(I understand))))
;End Renumber ;Begin Drain
            ((match '(drain (? inmap) over (? inmap2) for (? outmap))

text)
            (addparent inmap outmap)
            (addparent inmap2 outmap)
            (addchild outmap inmap)
            (addchild outmap inmap2)
            (fput outmap 'command 'value 'drain)
            (print '(I understand))))
;End Drain ;Begin Spread
            ((match '(spread (? inmap) to (? to_value)
                      through (? inmap2) over (? inmap3)
                      (? outmap))
             text)
            (addparent inmap outmap)
            (addparent inmap2 outmap)
            (addparent inmap3 outmap)
            (addchild outmap inmap)
            (addchild outmap inmap2)
            (addchild outmap inmap3)
            (fput outmap 'to_value 'value to_value)
            (fput outmap 'command 'value 'spread)
            (print '(I understand)))

((match '(spread (? inmap) to (? to_value) through
                      (? inmap2) for (? outmap))
             text)
            (addparent inmap outmap)
            (addparent inmap2 outmap)
            (addchild outmap inmap)
            (addchild outmap inmap2)
            (fput outmap 'to_value 'value to_value)
```

Figure 49F

```
        (fput outmap 'command 'value 'spread)
        (print '(I understand)))

((match '(spread (? inmap) to (? to_value) for (? outmap))
                    text)
        (addparent inmap outmap)
        (addchild outmap inmap)
        (fput outmap 'command 'value 'spread)
        (fput outmap 'to 'value to_value)
        (print '(I understand)))
;End Spread ;Begin Differentiate--Slope Map
        ((match '(differentiate (? inmap) for (? outmap))
                text)
        (addparent inmap outmap)
        (addchild outmap inmap)
        (fput outmap 'command 'value 'differentiate)
        (print '(I understand)))
;End Differentiate ;Begin Radiate
        ((match '(radiate (? inmap) for (? outmap))
                text)
        (addparent inmap outmap)
        (addchild outmap inmap)
        (fput outmap 'command 'value 'radiate)
        (print '(I understand)))
;End Radiate ;Begin Radiate
        ((match '(radiate (? inmap) to (? radiate_value)
                    for (? outmap))
                text)
        (addparent inmap outmap)
        (addchild outmap inmap)
        (fput outmap 'command 'value 'radiate)
        (fput outmap 'radiate_value 'value radiate_value)
        (print '(I understand)))
;End Radiate
```

Figure 49G

```
;Begin Add
        ((match '(add (? inmap) to (? inmap2) for (? outmap))
            text)
        (addparent inmap outmap)
        (addparent inmap2 outmap)
        (addchild outmap inmap)
        (addchild outmap inmap2)
        (fput outmap 'command 'value 'add)
        (print '(I understand)))
;Begin Multiply
        ((match '(multiply (? inmap) by (? inmap2) for (? outmap))

text)
        (addparent inmap outmap)
        (addparent inmap2 outmap)
        (addchild outmap inmap)
        (addchild outmap inmap2)
        (fput outmap 'command 'value 'multiply)
        (print '(I understand)))
;End Multiply ; ANSWER QUESTIONS ABOUT RELATIONSHIPS BETWEEN MAP LAYERS
;
        ((match '(What is (? x)) text)
            (setq isaflag nil)
            (setq includeflag nil)
            (cond((setq y (get x 'parent))
                (setq isaflag t))
                ((setq y (get x 'child))
                (setq includeflag t)))
            (print
                (append
                    (list x)
                    (cond (isaflag '(is a parent of))
                        (includeflag
                            '(is a child of)))
                    (makeconj y))))

((match '( Is (? map1) a parent of (? map2))
```

Figure 49H

```
                text)
        (cond ((isatest map1 map2 10)
               (print
                   (append '(yes indeed)
                           (list map1)
                           '(is a parent of)
                           (list map2))))
              (t (print '(Sorry not that I know of)))))))

((match '(What is the lineage of (? map))
           text)
        (ancestors map))

((match '(What are the final products of (? map))
           text)
        (decendents map))

((match '(why is (? map1) a parent of (? map2))
           text)
        (cond ((isatest map1 map2  10)
               (print (cons 'Because
                           (explain_links map1 map2))))
              (t (print '(But it is not!)))))

((match '(What are the input scales of (? map))
           text)
        (scale map))

(t (print '(I do not understand))))))

;************************************************************
; A recursive pattern-matching function for use in production-
; systems programming.
(defun match (p s)
       (cond ((null p) (null s))
             ((atom (car p))
              (and s
                   (equal (car p) (car s))
                   (match (cdr p) (cdr s))))
             ((and s
```

Figure 49l

```
              (eq (caar p) '?))
           (cond ((match (cdr p) (cdr s))
                  (set (cadar p) (car s)) t)
                 (t nil)))
         ((and s
               (apply (caar p) (list (car s)))
               (match (cdr p) (cdr s)))
          (set (cadar p) (car s)) t)
         (t nil)))

; This is supposed to return some things that y is or is more
; general than than y, but has not been implemented with related
; generalizations.
(defun makeconj (y)
      y)

; This returns the lineage of a particular map layer.
(defun ancestors (map)
      (cond ((null map) nil)
            ((and
               (null (fget map 'command 'value))
               (null (fget map 'SDF 'name)))
                  (print (append (list map)
                         '(lacks source description information)
                         (terpri))))
            ((null (fget map 'command 'value))
                  (print (append (list map)
                         '(is an original map layer)
                         (terpri))))
            (t (print (append '(Input to)
                         (list map)
                         '(is)
                         (get map 'child)
                         '( Command is)
                         (fget map 'command 'value)
                         (terpri)))
              (cond((null (cdr (get map 'child)))
                    (ancestors (car (get map 'child))))
                   (t (ancestors (car (get map 'child)))
                      (ancestors (cadr (get map 'child)))))))))
```

Figure 49J

```
; This returns the scale of a particular map layer.
(defun scale (map)
     (cond ((null map) nil)
          ((and
               (null (fget map 'command 'value))
               (null (fget map 'SDF 'name)))
                    (print (append (list map)
                         '(lacks source description information)
                         (terpri))))
          ((and
            (null (fget map 'command 'value))
            (not (null (fget map 'SDF 'name))))
                    (print (append (list map)
                         '( scale )
                          (fget map 'SDF 'scale)
                          (terpri))))
          (t   (cond((null (cdr (get map 'child)))
                         (scale (car (get map 'child))))
                    (t (scale (car (get map 'child)))
                         (scale (cadr (get map 'child)))))))))

; This returns the geneaology of a particular map layer.
(defun decendents (map)
     (cond ((null map) nil)
          ((null (car (get map 'parent)))
                    (print (append (list map)
                         '(is a product map layer) (terpri))))
          (t (print (append '(Output of)
                         (list map)
                         '(is)
                         (get map 'parent)
                         '( Command is)
                         (fget map 'command 'value)
                         (terpri)))
               (cond((null (cdr (get map 'parent)))
                         (decendents (car (get map 'parent))))
                    (t (decendents (car (get map 'parent)))
                         (decendents (cadr (get map 'parent)))))))))

;*************************************************************
; SEMANTIC NET HANDLING FUNCTIONS
```

Figure 49K

```
;
(defun putprop (atom_name value prop_name)
      (setf (get atom_name prop_name) value))

(defun addtoset (elt lst)
      (cond ((member elt lst) lst)
            (t (cons elt lst))))

(defun addparent (aname x)
      (putprop aname (addtoset x (get aname 'parent)) 'parent))

(defun addchild (aname x)
      (putprop aname (addtoset x (get aname 'child)) 'child))

(defun isatest (map1 map2 n)
      (cond ((eq map1 map2) t)
            ((member map2 (get map1 'parent)) t)
            ((zerop n) nil)
            (t (any (mapcar (function (lambda (xx)
                  (isatest xx map2 (- n 1))))
                     (get map1 'parent))))))

(defun any (lst)
      (cond ((null lst) nil)
            ((car lst) t)
            (t (any (cdr lst)))))

(defun explain_links (x y)
      (cond ((eq x y) '(They are identical))
            ((member y (get x 'parent)) '(You told me))
            (t (explain_chain x (get x 'parent) y))))

(defun explain_chain (x l y)
      (cond ((null l) nil)
            ((member y l) (cons 'and (tell x y)))
            ((isatest (car l) y 10) (append (tell x (car l))
                                     (explain_chain (car l)
                                             (get (car l) 'parent)
                                          y)))
            (t (explain_chain x (cdr l) y))))
```

Figure 49L

```
(defun tell (x y)
      (list x 'is 'a 'parent 'of y))

;***********************************************************
; FRAME HANDLING FUNCTIONS
;
(defun fget (frame slot facet)
     (cdr (assoc facet (cdr (assoc slot (cdr (get frame
'FRAME))))))))

(defun extend (key a-list)
     (cond ((assoc key (cdr a-list)))
           (t (cadr (rplacd (last a-list) (list (list key)))))))

(defun follow-path (path a-list)
     (cond ((null path) a-list)
           (t (follow-path (cdr path) (extend (car path) a-list)))))

(defun fget-frame (frame)
     (cond ((get frame 'FRAME))
           (t (setf (get frame 'FRAME) (list frame)))))

(defun fput (frame slot facet value)
      (let ((value-list (follow-path (list slot facet)
                 (fget-frame frame))))
            (cond ((member value value-list) nil)
                  (t (rplacd (last value-list) (list value)) value))))

(defun fremove (frame slot facet value)
      (let ((value-list (follow-path (list slot facet)
                                  (fget-frame frame))))
         (cond ((member value value-list)
                (delete value value-list) t)
               (t nil))))

(defun fget-z (frame slot)
     (fget-z1 slot (fget-classes frame)))

(defun fget-z1 (slot classes)
      (cond ((null classes) nil)
            ((fget-v-d (car classes) slot))
```

Figure 49M

```
            (t (fget-zl slot (cdr classes))))))

(defun fget-classes (start)
    (reverse (fget-classes1 (list start) nil)))

(defun fget-classes1 (queue classes)
    (cond ((null queue)classes)
          (t (fget-classes1
                (append (fget (car queue) 'a-kind-of 'value)
                                (cdr queue))
                (cond ((member (car queue) classes) classes)
                      (t (cons (car queue) classes)))))))

(defun fget-v-d (frame slot)
    (cond ((fget frame slot 'value))
          ((fget frame slot 'default))
          (t nil)))
```

Figure 49N

(geo_lineus)

(I AM GEO_LINEUS)

(PLEASE GIVE ME INFORMATION OR ASK QUESTIONS) (renumber landuse assigning 1 to 2 through 13 assigning 0 to 1 through 11 assigning 0 to 14 through 18 for wetuse)

(I UNDERSTAND) (radiate wetuse to 2 for rad1map)

(I UNDERSTAND) (radiate wetuse to 6 for rad2map)

(I UNDERSTAND) (add rad1map to rad2map for adradmap)

(I UNDERSTAND) (multiply adradmap1 by county for counsens)

(I UNDERSTAND)

Figure 50

(I UNDERSTAND) (what is the lineage of counsens)

(INPUT TO COUNSENS IS COUNTY ADRADMAP1 COMMAND IS MULTIPLY)

(COUNTY IS AN ORIGINAL MAP LAYER)

(INPUT TO ADRADMAP1 IS ADRADMAP COMMAND IS RENUMBER)

(INPUT TO ADRAPMAP IS RAD2MAP RAD1MAP COMMAND IS ADD)

(INPUT TO RAD2MAP IS WETUSE COMMAND IS RADIATE)

(INPUT TO WETUSE IS LANDUSE COMMAND IS RENUMBER)

(LANDUSE IS AN ORIGINAL MAP LAYER)

(INPUT TO RAD1MAP IS WETUSE COMMAND IS RADIATE)

(INPUT TO WETUSE IS LANDUSE COMMAND IS RENUMBER)

(LANDUSE IS AN ORIGINAL MAP LAYER)

Figure 50a

```
(what is landuse)
(LANDUSE IS A PARENT OF WETUSE)

(what is counsens)
(COUNSENS IS A CHILD OF COUNTY ADRADMAP1)

(is landuse a parent of rad1map)
(YES INDEED LANDUSE IS A PARENT OF RAD1MAP)

(why is lanudse a parent of rad1map)
(BECAUSE LANDUSE IS A PARENT OF WETUSE AND WETUSE IS A PARENT
OF RAD1MAP)

(what is wetuse)
(WETUSE IS A PARENT OF RAD2MAP RAD1MAP)

(is adradmap a parent of landuse)
(SORRY NOT THAT I KNOW OF)
```

Figure 50b

```
(geo_lineus) I am Geo_lineus
Please give me information or ask questions: import cover landuse
landuse What is the source name? landuse-landcover Containing what cartographic features? hydrography urban
agriculture wetland What is the source date? 3/12/75

What is the source agency? USGS

What is the source scale? 1/24000

What is the source projection? UTM

What is the source accuracy? +-80 meters

Thank You!
```

Figure 54 renumber landuse assigning 1 to 12 through 13 assigning
0 to 1 through 11 assigning 0 to 14 through 18 for wetuse (I UNDERSTAND) radiate wetuse to 2 for rad1map (I UNDERSTAND) radiate wetuse to 6 for rad2map (I UNDERSTAND) add rad1map to rad2map for adradmap (I UNDERSTAND) renumber adradmap assigning 3 to 4 for adradmap1

(I UNDERSTAND)

Figure 55

```
        export cover adradmap1 eco_zones

What is the product's name? eco_zones

What is the product's use? Environmental protection of wetlands

Who are the product's users? Dept of Health and Environ.
Conservation

Who is responsible for the product? Diego Essinger

What is the product's release date? 3/5/89

Thank You!
```

Figure 57

Is landuse a parent of adradmap (YES INDEED LANDUSE IS A PARENT OF ADRADMAP)

Figure 58

What is the lineage of adradmap1

(INPUT TO ADRADMAP1 IS ADRADMAP COMMAND IS RENUMBER)

(INPUT TO ADRAPMAP IS RAD2MAP RAD1MAP COMMAND IS ADD)

(INPUT TO RAD2MAP IS WETUSE COMMAND IS RADIATE)

(INPUT TO WETUSE IS LANDUSE COMMAND IS RENUMBER)

(LANDUSE IS AN ORIGINAL MAP LAYER)

(INPUT TO RAD1MAP IS WETUSE COMMAND IS RADIATE)

(INPUT TO WETUSE IS LANDUSE COMMAND IS RENUMBER)

(LANDUSE IS AN ORIGINAL MAP LAYER)

Figure 59

What are the final products of landuse (ADRADMAP1 IS A PRODUCT MAP LAYER)

Figure 60

Why is rad2map a parent of adradmap1

(BECAUSE RAD2MAP IS A PARENT OF ADRADMAP AND ADRADMAP IS A PARENT OF ADRADMAP1)

Figure 61

What is rad2map (RAD2MAP IS A PARENT OF ADRADMAP)

Figure 62

METHOD AND MEANS FOR LINEAGE TRACING OF A SPATIAL INFORMATION PROCESSING AND DATABASE SYSTEM

TECHNICAL FIELD

This invention relates to the art of utilizing computerized artificial intelligence techniques to create lineage information to document and trace modifications to various layers of information in a spatial database. Such information enables a user to (1) assess the quality of spatial database layers and (2) recognize and reconcile potential problems caused by transformational modifications to the database.

BACKGROUND ART

Systems for documenting and tracking changes to data files within an information system are known. These methods range from very simple history files, log files and audit files to more complicated schemes designed to prevent use of a software system when one of that software system's constituent modules has been modified but not yet certified as correct.

History Files

The most basic form of documenting changes to a data file is through use of a "history file". The capability to maintain a history file is often part of a computer's operating system and provides a way for the system administrator to keep track of commands that have been given to the system by users. An examination of the history file will yield commands used and subsequent changes made to various files by users. An example of such a history can be found in the UNIX Operating System (Fiedler and Hunter, 1986).[1] References used throughout this specification shall be separately identified in detail in an Information Disclosure Statement to be filed within sixty (60) days.

Audit, Log, and Watch Files

A variation on the history file approach is the "audit", "log" and "watch" file system of providing a detailed listing of user commands and system output. Audit and watch files typically record the command and system responses for each given command. In addition, the log file can record date, elapsed time, and amount of system resources used. Examples of such facilities are the ERDAS "audit file" system (ERDAS, 1985) and the ARC/INFO "watch file" and "log file" capability (ESRI, 1987).

Both the history files and the audit, watch, and log files have serious short-comings to the user. None of these records are accompanies by information linking them to specific data records within a database. Thus, review of many pages of output or CRT screens of data is required to determine the nature of any changes ("transformation") made by a user command that has resulted in a particular data record. Due to the dynamic nature of spatial information systems, such manual approaches to determining all the factors that acted upon a given data file are grossly inadequate.

Version Control Systems

An allied field of engineering known as "version control systems" is concerned with revisions that have been made to text. These contemporary software packages are capable of documenting revisions that have been made to text over a period of time. Such packages generally rely upon the structure and implementation of the UNIX Source Control and Configuration System ("SCCS"). SCCS is a library of UNIX operating system functions from which the user can configure a system for maintaining a history of revisions to source documents (Allman, 1984). The SCCS stores the initial document and a file of changes ("delta's") to that document associated with each revision. The delta is the set of differences between a revision and the previous revision. Each delta is accompanied with an optional user comment and time and date stamp. Using this file of deltas, a user can start with the initial document and recreate any intermediate revision that has been created over time. Alternatively, configuration control systems can store the complete current versions of a document together with a series of deltas containing the history of revisions made over time. This allows the user to recreate any previous version (Kinzer and Kinnaird, 1987).

In a similar fashion, U.S. Pat. No. 4,558,413 to Schmidt et al. describes a "software version management system" that contains a series of unique identifiers which describe the chronological updating of the current version of software being run. Thus, as each new version of software is created, a history file of the changes to that software is created. Similarly, U.S. Pat. No. 4,714,992 to Gladney et al. describes a method of locating obsolete replicas of data in a database in a distributed processing system based, in part, upon knowledge of identifiers associated with a set of obsolete data and comparing them to the most current data identifiers. In this fashion obsolete data are eliminated from a distributed processing system.

The difficulty with these various version control systems, however, is that they do not automatically document the changes that take place between revisions. That is, the user is required to type in data necessary to document the changes. In addition, they only function with text files and not spatial data files. Implementation of a version control system is much simplified by the fact that comparison of two text files can take place on a byte by byte basis. Therefore determining changes between text files is far less complex than comparing spatial data files. Thus, traditional version control systems essentially detect one dimensional changes while spatial information systems must track and record changes to one dimensional, two dimensional and three dimensional databases.

Geographic Information Systems

A geographic information system ("GIS") "is a decision support system involving the integration of spatially referenced data in a problem solving environment." (Cowen, 1987). It is based on software designed to collect, store, retrieve, manipulate and display spatial objects defined as points, lines or areas. (Clark, 1986, Jones et al. 1986 and Dueker, 1987). What makes a GIS unique is its power to transform existing spatial data into different and more useful data.

The synthesis of new data from old data is a "double-edged sword." On one hand a new database is created with more information than the old one; on the other hand the added information may be meaningless. The quality of created data is tied to the input data. The traditional database manager's adage "garbage in equals garbage out" applies to GIS applications as well. However, the quality of GIS synthesized data layers is dependent on more than just the quality of input data. In addition to the quality of the input data, the quality of GIS synthesized data layers is based upon the logical consistency of the transformation used to derive the new information. That is, does the transformation requested make sense in light of the quality of the data used for that transformation.

Importance of spatial data quality is further magnified by the fact that output products from GIS applications are often used in critical decision making. GIS output is often utilized for corporate, medical, and military analysis and planning as well as to help politicians and bureaucrats make informed decisions in the management of natural or human resources.

The task of identifying the spatial data records ("layers"), the characteristics or "attributes" of the layers, and the processing steps that transpired between layers is called "lineage tracing" throughout the course of this patent application. "Lineage" information is used throughout this patent application to describe documentation of the transformations applied to layers stored within a spatial database (e.g. spatial filtering, distance buffering, overlaying, etc.), links specifying the input/output relationship among layers (e.g. parent, child), and attributes describing the nature of the data (e.g. scale, projection, source, agency, spectral bands, etc.).

Map Librarians

In geographic information systems, methods of organizing the current database of spatial information known as "map librarians" have been established (Aronson and Morehouse, 1984). Map librarians, however, do not typically record the lineage of current data or the changes which have been applied to a particular piece of information in a database when that information is used to produce other map products. In general, map librarians provide a series of tools organizing a static current database. While useful for that function, they do not address the dynamic nature of the spatial database as new layers are created.

Spatial Data Files

A system has been proposed for storing the changes between two image data (i.e. raster) files (Langran, 1988). Storing changes alone can be more efficient from a data storage perspective than storing entire records of individual data files. Rather than storing complete "snap shots" of the study area, only the changes that have occurred since the previous time period are stored. For example, "to detect changes between images A and B, we subtract A from B to produce a sparse matrix AB of the delta values of changed pixels (picture elements). Either (A, AB) or (B, AB) contains the full information of (A, B) . . . ." We might choose to reconstitute the full matrices A and B by adding AB to A to reconstruct B, or subtracting AB from B to reconstruct A. However, Langran's spatial delta file does not contain information concerning the nature of the change between A and B. That is, there is no documentation of the processing steps that yielded B from A and, therefore, it is not clear in the delta file whether or not B resulted from a valid transformation. Even when such comparisons yield delta files that can be used to compare images before and after processing, the nature of the processing, i.e. the documentation of the mathematical transformations (parameters and algorithms) is lost. In addition, changes to complex spatial data structures coding topology such as POLYVRT (Peucker and Chrisman, 1975), DLG (Allder and Elallal, 1983) and TIGER (Marx, 1986) cannot be captured by such raster based pixel (cell) by pixel (cell), comparison methods. Therefore, a simple comparison of data files does not suffice to document the nature of the change in data layers of geographic information systems.

Cartographic Modeling

As analog forms of spatial data (e.g. surveys, maps and charts) are entered into geographic information processing systems, they are rarely accompanied by documentation pertaining to their lineage. GIS users:

"are not generally explicitly aware of the source or accuracy of their data. First, most GIS databases are produced from digital map products. The original map products may be produced from imagery using rigorous photogrammetrical techniques or may be derived from other cartographic products. There may be several levels of abstraction and generalization between the cartographic product and the remotely sensed data that was originally used to produce it. Once a map product is produced, none of the associated data used to produce it remains available. That is, the product is divorced from the quality, reliability and timeliness of the source material. For example, interpolation of digital terrain models from contour maps is not unheard of nor is interpolation of discrete depth points from bathometric models. How accurate is this interpolated data? Only by knowing the source and derivation methods can be we begin to establish data accuracy."

(McKeown, 1987.)

The cartographic model as described in the current invention serves as a basis for documenting the lineage of spatial data files and can thus play a fundamental role in establishing spatial data quality.

A cartographic model is a record of the steps of a spatial data processing application (Tomlin, 1983). It is a representation specifying the processes involved in creating a spatial data layer and the data interfaces between those processes. The basic building blocks of a cartographic model are thematic layers, processes, and data flows. A thematic layer is a digital cartographic data record. These thematic layers are acted upon by GIS manipulations that transform them into yet other layers.

From a pictorial standpoint, these transformations are documented by arrows representing data flows between layers. The nature of the transformations, that is, the processes that transform the layers is documented as annotations along the data flow arrows. FIG. 1 is a relationship of this type. MAP 1 is converted to MAP 2 by the function "RENUMBER". The transformation of MAP 1 to MAP 2 by RENUMBER is captured by documenting information about MAP 1, documenting information concerning the command RENUMBER in conjunction with the arrow between MAP 1 and MAP 2, and documenting information about the final Map 2. Thus, a cartographic model is essentially a flow chart illustrating a sequence of data transformations necessary to achieve a desired spatial data product. However, the cartographic model itself is not enough to track lineage. This is because an individual relying upon any final spatial data product (e.g. map) must know not only the processing steps but the characteristics (i.e. attributes) of the data sources that contributed to the final product as well. In the current invention, this lineage information is combined and stored in an adaptation of the cartographic model ("the adapted cartographic model").

Lineage information documented in the adapted cartographic model is important to insure that various steps leading to the final product are correct. Further, lineage information is important to the kinds of decisions that can be made with the resulting data. Thus, if an individual is dealing with a very dynamic, real-world situation such as a military conflict or recent occurring natural disaster it is important that the final cartographic product being used contains valid, up-to-date information. If any data source contributing to that map is outdated, or if the logic behind the spatial data manipulation is in error a decision that is based upon it might be seriously flawed.

Lineage information can assist in answering questions including:

What inputs were used to create a map layer?
What layers are original inputs?
What are the sources, scales, projections, and accuracies of the original data inputs?
Which layers are derived?
What processing steps created a derived layer?
Are the processing steps that created a derived layer valid?
Is there more than one way to create a layer?
What layers are affected by a change to a particular layer?
When did the data accurately describe the real-world situation?
When was the data entered into the database?
When did a particular transformation occur to the database?

Digital Image Processing

Digital image processing systems are a form of GIS that require some special considerations. Raw data for a digital image processing system can be derived from a number of sources. For example, they may be derived from commercial satellites orbiting the earth, (e.g. Landsat, SPOT Satellite), airborne platforms (e.g. camera systems, infrared scanners, side-looking airborne radar) and from medical imagery systems (e.g. CAT, PET and NMR). Each image may consist of brightness values sensed over a number of different spectral bands, each of which constitutes an individual record of the image for which the sensing is done, or the spectral bands may be stored as a single digital record. It is frequently necessary to combine multi-spectral bands of satellite imagery to derive a final thematic spatial record satisfactory to a user.

Prior to becoming a final thematic spatial data product, images may go through a series of enhancements or modifications that include geometric rectification, contrast enhancement, edge sharpening, Fourier transform filtering, or a myriad of other processes prior to and after combination, all of which will be familiar to one skilled in the art of remote sensing and image processing. The processing steps may require the combination of ancillary information such as ground control points for rectification and registration or digital spatial data files for knowledge based classification methods.

In remote sensing applications, it is sometimes necessary to perform a temporal analysis of a series of images. Thus, an image over the same geographic region at time T1 may be combined with another image over the same geographic region at time T2. In order to do these temporal combinations, however, a series of digital image processing algorithms may also be applied in order to allow the best comparison of one image to the other. The results of such an analysis are useful only if the dates of each image, the spectral resolution of each image, and the spectral bands for each image are known. When this information is known, the nature of the change and the time period over which that change took place can be calculated. Thus, an "adapted cartographic model" describing the imagery source material and all the intermediate transformations can be used to determine if the final product of image processing is satisfactory for a particular application.

The final spatial data product may be a result of many different processes and many different original data inputs. As with all spatial data, in order to understand the product, it is very important to identify the imagery sources for, and examine the processing steps used to create it. Such an analysis would revolve around answers to questions including:

What were the original data sources?
What spectral bands are included in any image data layer?
What is the sensor?
What is the spatial resolution of the sensor?
What is the temporal resolution of the sensor?
What is the date, time, and location of the source imagery?
What was the cloud cover for the source imagery at the time of sensing?
What is the angle of viewing when the image was taken?
What is the distributing agency?
What were the transformations used to create the derived spatial data record?
What were the ancillary data used?
What role did the ancillary data play in the transformation?

SUMMARY OF THE INVENTION

The invention automates the adapted cartographic model previously discussed thereby documenting the series of steps leading to an end product. The invention automates the creation of knowledge concerning the conditions of those steps (e.g. parameters, algorithms, mathematical transformations) as well as the documentation of attributes of data inherent in them. This information is critical to understanding the quality of the final end product of information processing. The essence of the invention is the creation, storage, and manipulation of the knowledge concerning a database. This knowledge representation allows the user to understand the information in the spatial database. The invention thus creates a "meta-description" wherein knowledge about the database is expressed. (Smith, 1978). Automating the cartographic model using the invention, therefore, involves transforming it into a knowledge representation. This knowledge representation is therefore a "meta-database," or a database of information that relates to the database of interest. For purposes of this patent application, we shall refer to this knowledge representation alternatively as a "meta-database" and a "knowledge representation". As a knowledge representation, the adapted cartographic model is a representational account of the knowledge embodied in the overall process of a spatial data processing application. The automated adapted cartographic model provides the causal relationship between the final spatial data layer (the final data product) and each of the individual steps that created it from source digital spatial records.

Thus, the automation of the adapted cartographic model requires a set of routines to encode the processing steps within a GIS application. Automation also requires routines to manipulate the structure of the adapted cartographic model to make inferences based upon the transformations that take place within spatial algorithms. Therefore, the present invention embodies routines that have been developed to: 1) capture the nature of the temporal topology (Langran and Chrisman, 1988) within a spatial application (i.e. relationships between input and output records), and 2) manipulate the data structure to draw inferences concerning the lineage of spatial data records. Within this framework the invention solves many existing difficulties in GIS database utilization.

BRIEF DESCRIPTION OF DRAWINGS

FIG. 3—Generalized Source Description Frame.

FIG. 4—Image Processing Source Description Frame.

FIG. 5—Generalized Command Frame.

FIG. 6—Generalized Product Frame.

FIG. 19—Overlay command rule.

FIG. 20—Rules for insuring a valid overlay.

FIG. 28—Match function code.

FIG. 29—Command template for Match function.

FIG. 30—Code for creation of semantic network of parent/child relationships between layers.

FIG. 32—Completed Source Description Frame.

FIG. 33—Command for creating Source Description Frame.

FIG. 34—Completed Command Frame.

FIG. 35—Commands for completing the Command Frame.

FIG. 36—Completed product Frame.

FIG. 37—Command for completing the Product Frame.

FIG. 38—Algorithm to integrate two applications.

FIG. 39—Commands to answer the query "What is MAP1?"

FIG. 40—Sample output from the question "What is?"

FIG. 41—Commands to perform a search of ten generations of MAP1.

FIG. 42—Sample output from the query requesting a search of ten generations of MAP1.

FIG. 43—Commands to perform the query "What is the lineage of MAP1?"

FIG. 44—Response to the query "What is the lineage of MAP1?"

FIG. 45—Commands to answer the query "Why is MAP1 a parent of MAP2?"

FIG. 46—Response to the query "Why is MAP1 a parent of MAP2?"

FIG. 47—Commands to answer the query regarding what Final Products result from a particular original input.

FIG. 48—Response to the query requesting information concerning Final Products that result from a particular input.

FIGS. 49-49N—LISP Code showing interaction of the parser, Knowledge Representer, and Knowledge Interrogator.

FIG. 50-50b—Sample interaction with the LIP and associated output.

FIG. 54—Start of LIP and creation of SDF.

FIG. 55—Creation of Wetlands map.

FIG. 57—Command to create a Final Product and PF.

FIG. 58—Query/response to question "Is LAND-USE a parent of ADRADMAP?"

FIG. 59—Query/response to question "What is the lineage of ADRADMAP1?"

FIG. 60—Query/response to question "What are the final products of LANDUSE?"

FIG. 61—Query/response to question "Why is RAD2MAP a parent of ADRADMAP1?"

FIG. 62—Query/response to questions "What is RAD2MAP?"

DETAILED DESCRIPTION

Networks and Frames

"Semantic networks" and "frames" are both general approaches for representing knowledge within the field of computer science known as "artificial intelligence" Semantic networks are built from inclusion hierarchies—that is, hierarchical structures where classes of objects are subclasses of others. The use of frames embodies the concept that knowledge relevant to a particular object, situation or concept can be represented.

Frames usually consist of a name of a particular object and a listing of attributes that typically describe that object (e.g. data record information). These attributes are usually called "slots" and various values documenting instances of the object fill the slots. The current invention comprises a hybrid structure for automating the adapted cartographic model consisting of both semantic networks and frames and methods for creating, deleting, and manipulating the structure.

In order to create a semantic network two elements are necessary: nodes and links. In the semantic network representation of the adapted cartographic model, a node represents a map layer within a spatial database. "Links" denote a semantic relationship between modeled layers of a spatial database. For purposes of this application, the relationship between layers of a GIS database is referred to as "parent" and "child" relationships specified by parent and child links between layers. Thus, child links emanate from a node and point to prior data layers of a spatial database which were input to a transformation process. Parent links emanate from a node and point to subsequent data layers of a spatial database which were the output layers created by some transformational process applied to the input layers. Thus, the child link answers the question, "What is the input layer that was used to create the given output layer?" The parent link answers the question "What output layers resulted from a given layer as input?"

Figure 2:
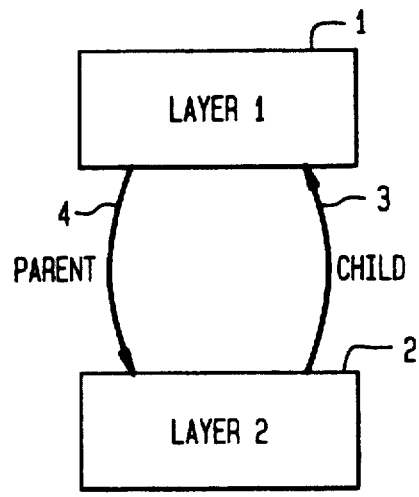
FIG. 2—"Parent" and "Child" relationship between two data layers.

FIG. 2 shows parent and child links between two layers. Layer 1 [1] is an original input (OI) and the parent of Layer 2 [2] and are related to one another by child link [3] and parent link [4].

With this kind of information certain knowledge based inferences are possible. For example, if a layer in a semantic network implementation of the cartographic model lacks a child link, then it was an original input to the database or a "source" [1]. Original input layers are documented typically with quality information attributes concerning such characteristics as: layer name, source information, feature types, date of source, responsible agency, scale, projection and accuracy or image ID, sensor, spectral bands, date, time, location, cloud cover, angle of viewing, format and distributing agency. Such information is stored in a Source Description Frame ("SDF").

FIGS. 3 and 4 show generalized SDF's that contain the type of information described above.

If a particular layer [2] does possess a child link [3], then that layer is an intermediate layer in the GIS. All intermediate layers have parent layers from which they were derived. These parent layers are identifiable through the child links of the intermediate layer. In addition to the child link, the intermediate layer is identified with the command attributes associated with its creation. The command, its modifiers, the modifiers values (if any) and the date and time that the command was executed is stored in appropriate command attribute slots in a Command Frame ("CF").

FIG. 5 shows a generalized CF that contains the information described above.

If a layer [2] does not possess a parent link it is a final "product". So long as the layer is not an original input to the database, it possesses a CF and its child links point back to the parent layer(s) from which it was derived. However, even if parent links are present, the layer in question may be used as a final product since any output can be both an input to: 1) a subsequent application, and 2) a decision making process. Therefore, each layer that is created in the adapted cartographic model may also have a final use frame that includes attributes concerning; to what use will the product be applied, who the users are, who is the responsible person for creating the map product, what is that person's affiliation (department or agency), and date of release of the product. This information is contained in a Product Frame ("PF").

FIG. 6 illustrates a generalized PF that contains the information described above.

Figure 7:
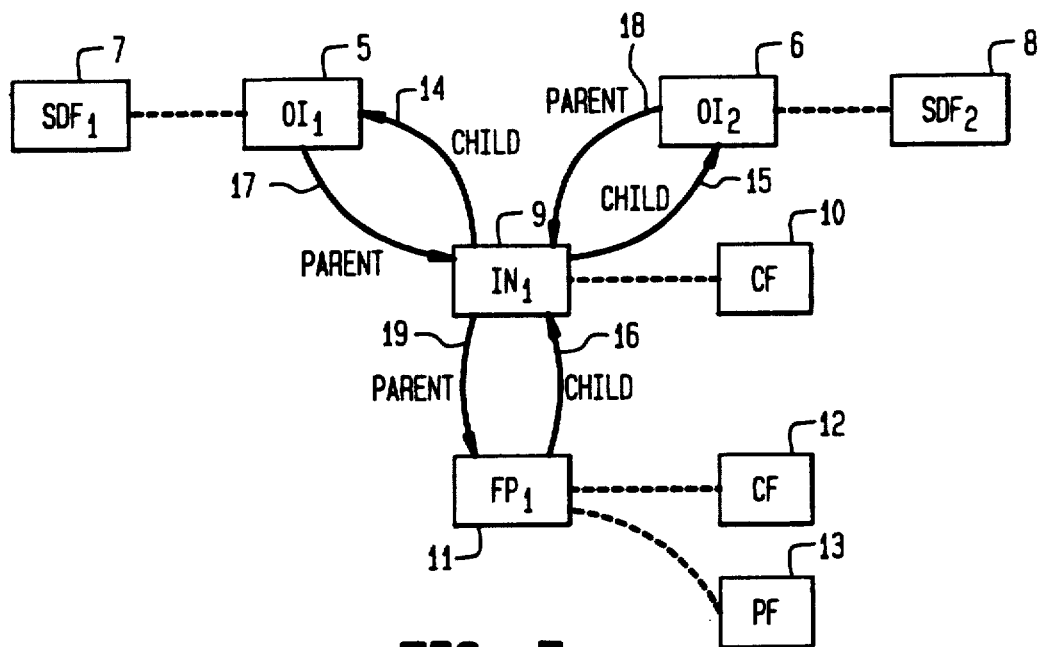
FIG. 7—Semantic network of parent and child links and associated SDF's, CF's and PF's.

FIG. 7 summarizes the prior discussion concerning the semantic network of parent and child links and associated SDF's, CF's and PF's. Original input layers [5, 6] each have their own SDF [7, 8]. Intermediate layers [9] created from the original input have its own command frames [10] each documenting the command that created it. Final product [11] created from the intermediate product [9] has its own command frame [12] documenting the command that created it as well as a product frame [13] documenting its use in decision making. Original inputs, intermediate layer and final product are linked by parent links [17, 18, 19] showing What derived layers they contributed to and child links [14, 15, 16] showing which inputs created the derived layers.

Figure 8:
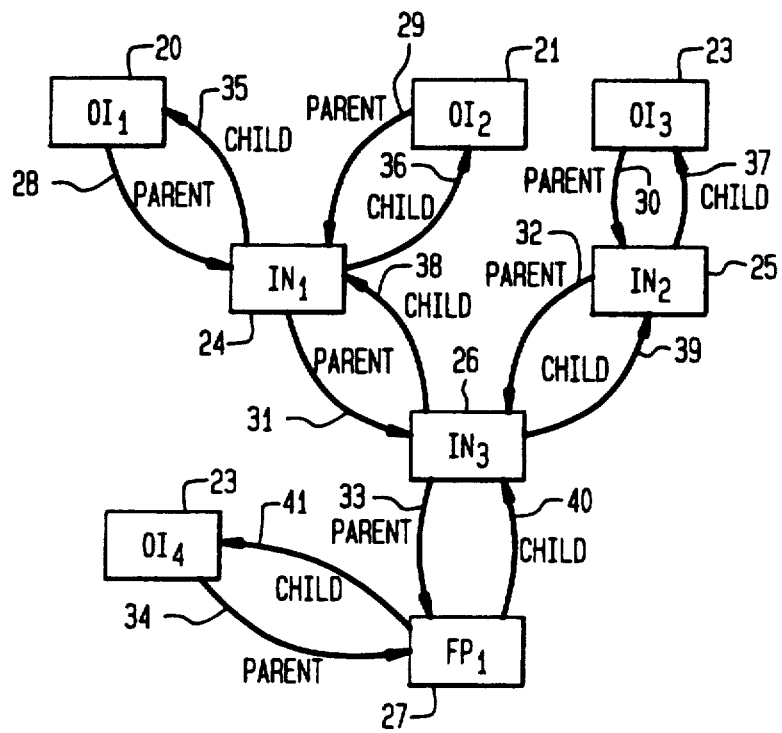
FIG. 8—Semantic network representation of an application to create a Final Product.

FIG. 8 shows a semantic network representation of an application to create a final product, FP1 [27], from original inputs OI1–OI4 [20, 21, 22, 23]. FIG. 8 illustrated that the original inputs [20, 21, 22] have parent links [28, 29, 30] to intermediate nodes IN1 and IN2 [24, 25] and IN1 and IN2 have child links back to OI1–OI3 [35, 36, 37]. Further, IN1 and IN2 have parent links [31, 32] to intermediate IN3 [26] and IN3 has child links [38, 39] back to IN1 and IN2. IN3 also has a parent link [33] to the final product [27] as does OI4 [23] have a parent link [34]. The final product [27] has child links to IN3 [40] and to OI4 [41]. From this figure, it can be seen that original inputs [20, 21, 22, 23] have no child links emanating from them, but have parent links [28, 29, 30, 34]. Further, intermediate nodes [24, 25, 26] have both parent [31, 32, 33] and child links [35, 36, 37, 38, 39] and nodes that have child links [40] but no parent links are final products [27]. It should also be noted that all final products can be identified as such by the fact that they have a PF [55] (Also see, FIG. 5). Thus, from these properties the invention can determine which layers are parents, which layers are intermediate nodes and which layers are final products.

Figure 9:
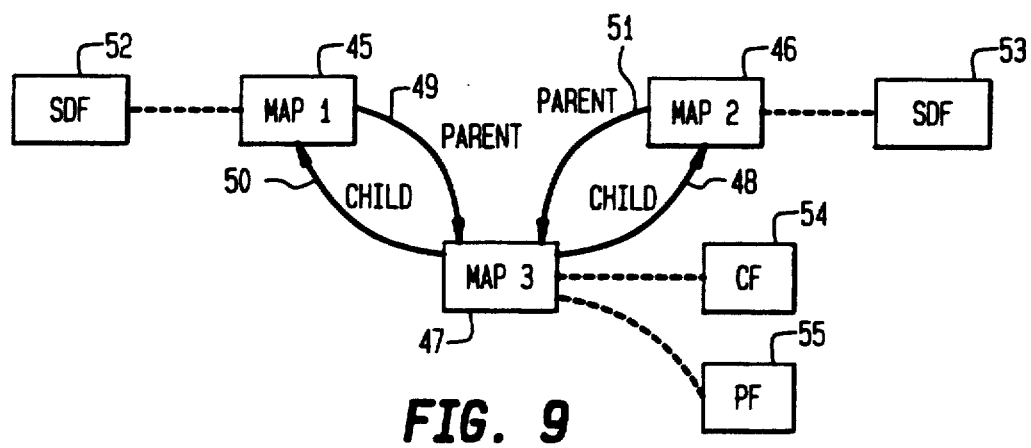
FIG. 9—Rudimentary meta-database describing a geographic information system database.

Referring to FIG. 9 a rudimentary meta-database describing a geographic information system database is depicted. Map 1 [45] is a representation of a GIS database layer that shows that it is an original input as is Map 2 [46]. Map 3 is a final product [47] having a child link [48] to Map 2 and a child link [49] to Map 1. In turn, Map 1 has a parent link [50] to Map 3 and Map 2 has a parent link [51] to Map S. Using the invention, a user can create a query to determine the information contained in the SDF [52] for Map 1 and the SDF [53] for Map 2 as illustrated. Map 3 will have both a CF [54] which describes the operations that created it, and a PF [55] which contains the attributes of Map 3 concerning its use as a product.

Figure 1:
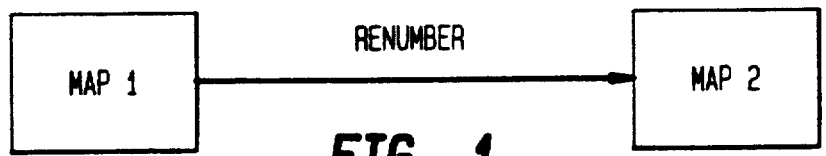
FIG. 1—Transformation of MAP1 to MAP2 by the function "RENUMBER".
Figure 10:
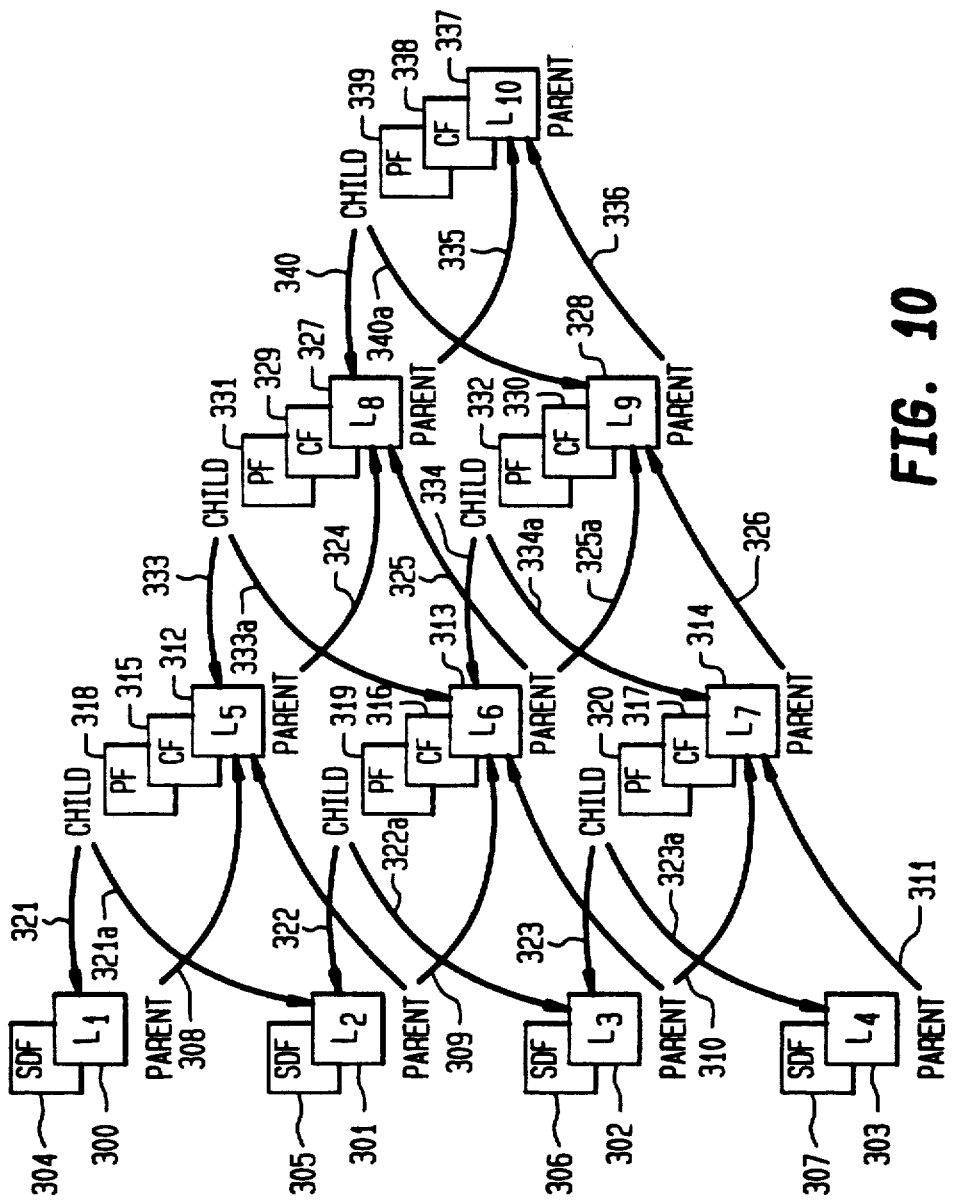
FIG. 10—Relationships among links, frames, and layers as established by the invention.

Referring to FIG. 10, the relationships among the various links and frames of the invention are illustrated. For purposes of illustration only, a combination of various data layers of a GIS is shown in FIG. 10. New data layers can also be created by algorithmic transformation of a single layer (FIG. 1). FIG. 10 should therefore not be viewed as restricting the invention solely to transformations that combine data layers. The spatial data processing system may have several original input or "source" layers [300, 301, 302, 303]. Each of these source layers have a source description frame (SDF) associated with it [304, 305, 306, 307] that contains information previously described concerning the source layers. Additionally, the invention creates parent links [308, 309, 310, 311] for the source layers that contributed to the creation of the intermediate layers.

When these source layers are combined, intermediate layers are formed [312, 313, 314]. The invention creates, for each intermediate layer a CF [315, 316, 317] containing the command information that caused the intermediate layer to be created, a PF [318, 319, 320] (if the layer is to be a final output product) and child links [321, 321a, 322, 322a, 323, 323a] relating the intermediate layer to the source layers that contributed to its creation.

In a similar fashion, other intermediate layers may also be formed [327, 328] by combination of previous intermediate layers. These additional intermediate layers will also have CF's [329, 330] and PF's [331, 332] (as appropriate). The invention will also assign child links [333, 333a, 334, 334a] at the time of formation of the new intermediate layers, and parent links [324, 325, 325a, 326] for the previous intermediate layer that contributed to the creation of the latter intermediate layers [327, 328].

When a final product [337] is created, the invention also creates a CF [338], a PF [339] and child links [340, 340a] relating to the intermediate layers that created the final product. Finally, the invention creates the parent links [335, 336] necessary to relate the intermediate layers to the final product.

The Lineage Information Processor ("LIP")

Figure 11:
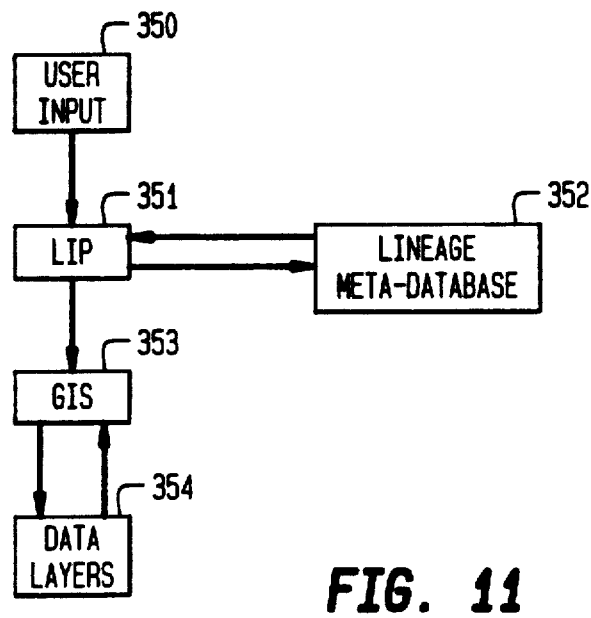
FIG. 11—Overview of software implementation of the invention.

The lineage information that is the foundation of the current invention contains (1) nodes that are representations of spatial data layers, (2) dual links between nodes that represent parent and child relationships, (3) frames accompanying the nodes for capturing attribute information concerning the data layers and the transformation created therein. The data flow though the invention is generally shown in FIG. 11 and uses user input [350] GIS commands that are entered directly into the system. As each command is processed by the LIP [351] it also flows to the GIS [353] which executes the desired command that may update the GIS database [354]. As the commands are executed the LIP creates a knowledge representation [352] of the relationship between input map layers and output map layers within the GIS database [354]. This knowledge representation is in effect an automated form of the adapted cartographic model. Thus, as the knowledge representation evolves, the transformational relationship between input and output layers is modeled. In this way the LIP not only keeps track of the geographic information system commands but creates a record of how individual layers are related to one another.

Figure 12:
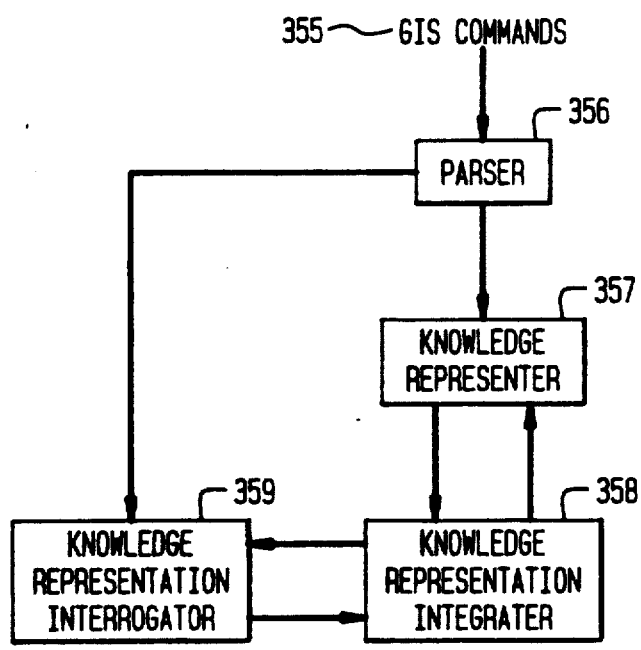
FIG. 12—Generalized flow chart of software modules.

In performing the above functions, the LIP utilizes the following building blocks depicted in FIG. 12: a parser [356], a knowledge representer [357], a knowledge representation integrater [358], and a knowledge representation interrogator [359]. Each of these components consists of a software module. Geographic information system commands are presented to the parser which extracts the input/output layers as well as the command and command modifiers. The parser presents this information to the knowledge representer which in turn creates the knowledge representation. As GIS applications are modelled by automated adapted cartographic models (i.e. each application has its own model), redundant information concerning the lineage of constituent or input layers may be eliminated by the knowledge representation integrater. The knowledge interrogator provides the mechanism for manipulating the automated adapted cartographic model to answer questions concerning lineage.

Parser

Referring to FIG. 12, in general, the parser [356] receives GIS commands [355] entered by a user. As each command is processed, the parser matches the command against stored information concerning that command. The stored information relates to the command structure of a given GIS. Each command has a structure (a "template") that provides the location of the command, input and output layers, and command modifiers and values. If the parser is to successfully match the command to its stored information, (1) the command and command modifiers (if any) must match one of the stored command templates; (2) the input layers must be uniquely identifiable and found within the meta-database.

Figure 13:
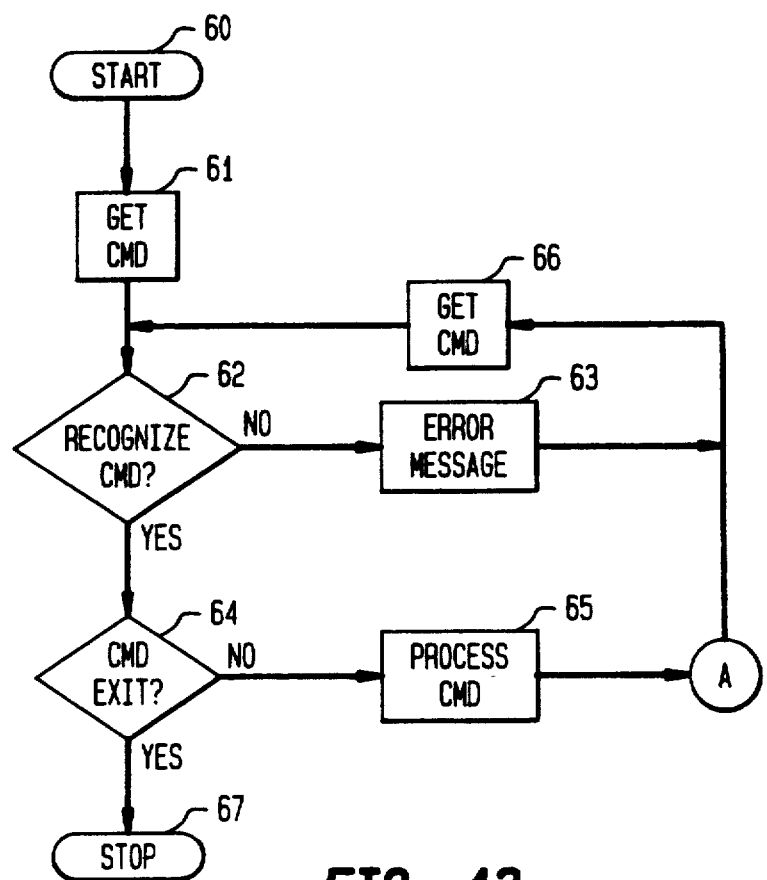
FIG. 13—General logic of the parser.

The general logic of the parser is illustrated in FIG. 13. If the command or the command modifier was illegal (e.g. a non-existent command, or a misspelled command or modifier) the LIP will reject the command. Similarly, if the input layer requested by the command is not present in the system or has been improperly entered into the system (i.e. no source description frame exists) the GIS command will also be rejected. If successful, the parser extracts the input/output layer identifiers and any command modifier values inherent in the user entered GIS command line.

Knowledge Representer

Figure 14:
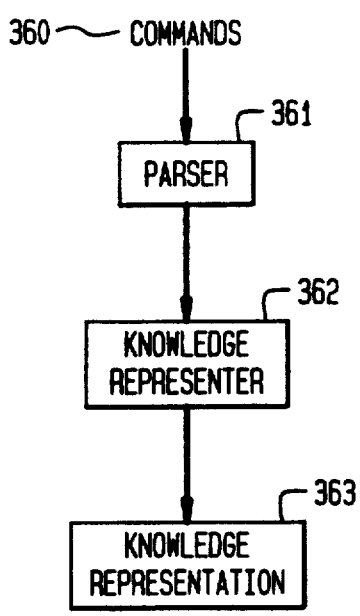
FIG. 14—The Knowledge Representer.

Referring to FIG. 14, the creation of the knowledge representation [363] begins with a user command [360] for importing a data layer (or creating one via digitizing analog spatial data). During the initialization process, the knowledge representer [362] creates a nodal representation in the meta-database of the data layer imported or created. The knowledge representer creates an SDF for such data layers by filling the various slots (shown in FIG. 3 & 4) in the associated source description frames for the node representing an initial data layer. Once this knowledge representation [363] exists for each particular initial input layer, the LIP can proceed to parse subsequent commands.

If the GIS command is a valid one, and the initial layers are properly entered, the parsed representation of the GIS command (i.e. the input/output layers, and command and command modifiers) is presented to the knowledge representer [362] by the parser [361]. The knowledge representer [362] in turn uses this information to update the knowledge representation [363] by adding a node, links, and frames concerning the newly created GIS layer. In this fashion, a new transformation is added to the knowledge representation of the adapted cartographic model.

In performing its function, the knowledge representer creates the appropriate parent/child links between the original input layers and the output layer. The knowledge representer designates the output layer as the child of each input layer by adding a child link emanating from the output layer and pointing to the input layer. Each input layer becomes a parent of the output layer by adding a parent link emanating from the input layer pointing to the output layer. The GIS command, and any associated modifiers, are placed in the command frame associated with the child node or output layer. In this way, the GIS processing step which has just occurred is added to the knowledge representation for a particular layer.

If the user command is one that exports a layer from the spatial database or plots it on a graphic output device, the knowledge representer prompts the user for information to be included in the PF (FIG. 6). This information includes to what use will the product be applied, who the users are, who is the responsible person for creating the map product, what is that person's affiliation (department or agency) and date of release of the product.

Knowledge Representation Integrator

The knowledge representation integrator provides a way of integrating multiple GIS applications. Each different spatial application (i.e. set of concatenated GIS commands resulting in a single product for use in decision making) is modeled with its own adapted cartographic model knowledge representation. Thus, various knowledge representations are presented to the knowledge representation integrator which examines the various automated cartographic models to determine if the structures share a layer or node.

Figure 15:
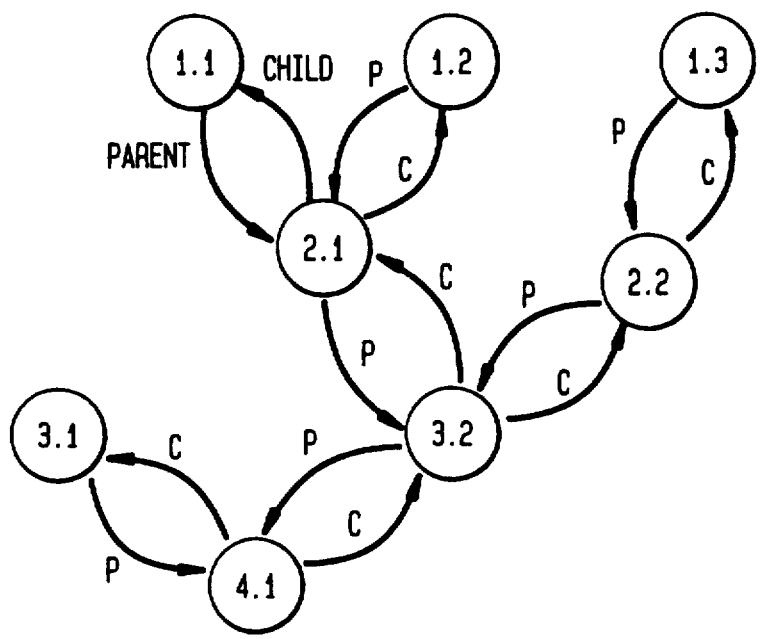
FIG. 15—Idealized Cartographic Model No. 1 having only nodes and parent/child links.
Figure 16:
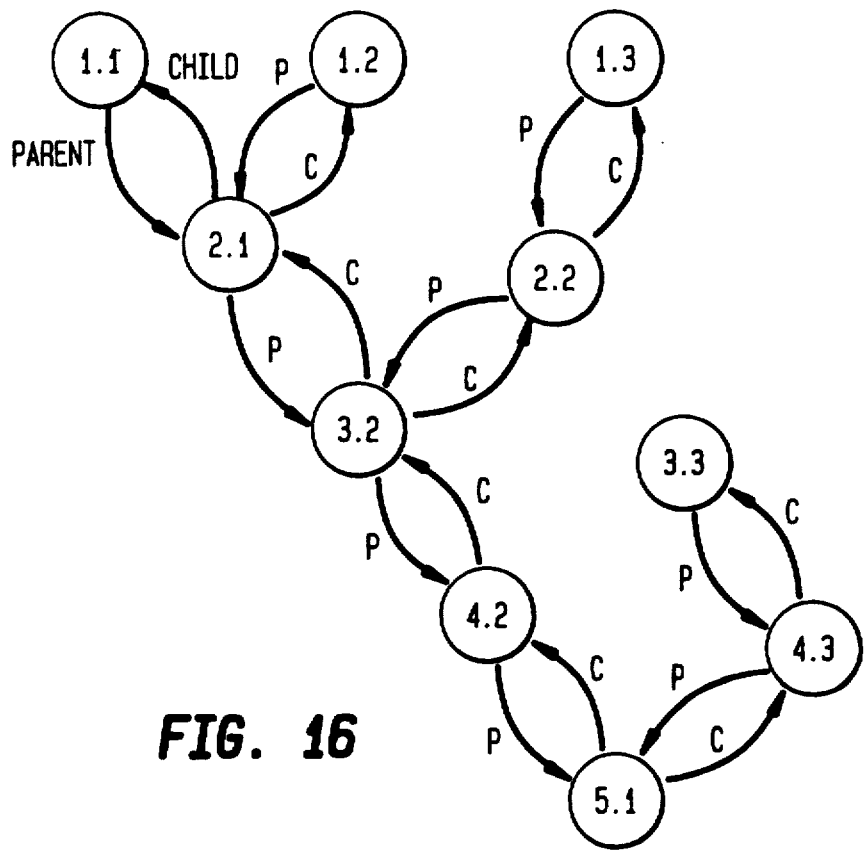
FIG. 16—Idealized Cartographic Model No. 2 having only nodes and parent/Child links.
Figure 17:
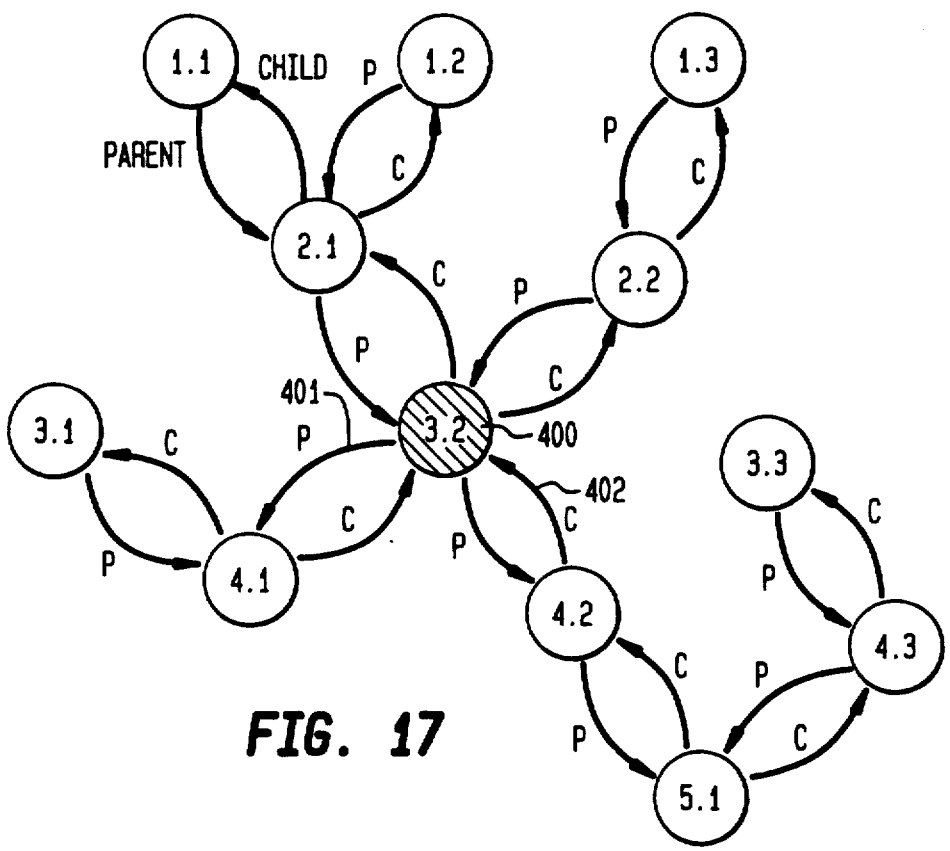
FIG. 17—Idealized Cartographic Models No. 1 and 2 joined at node 3.2.

For example, FIGS. 15 and 16 represent two idealized cartographic models having only nodes and parent/child links (i.e. no frame information). These two cartographic models share nodes 1.1-3.2. The knowledge representation integrater identifies the shared layers (nodes). This identification is possible since each layer is uniquely identifiable. When a shared layer is found, the cartographic models are joined at that node. When two or more cartographic model representations are joined at a shared node, the redundant representation of that node is discarded. In this fashion an integrated knowledge representation is formed as illustrated in FIG. 17. If a shared node is not found, the various models are not able to be integrated.

The knowledge representation integrater accomplishes this task in the following fashion. When the knowledge representation integrator is presented with a series of knowledge representations, it automatically determines if the existing knowledge representations have any duplicate nodes. If duplicate nodes are found, it begins the process of integration. The knowledge representation integrator first identifies one of the duplicate nodes to remain and be shared while the other duplicates will be removed. This is accomplished by appropriately directing all parent links from different knowledge representations to point to the single shared node that was common to those knowledge representations. Thus, a "shared node" is created. In a similar fashion the child links emanating from the duplicate nodes are deleted and are recreated to emanate from the shared node. Once the links have been created for the shared node, the representations of the duplicate nodes are deleted and the integration is complete.

The Knowledge Representation Interrogator

Figure 18:
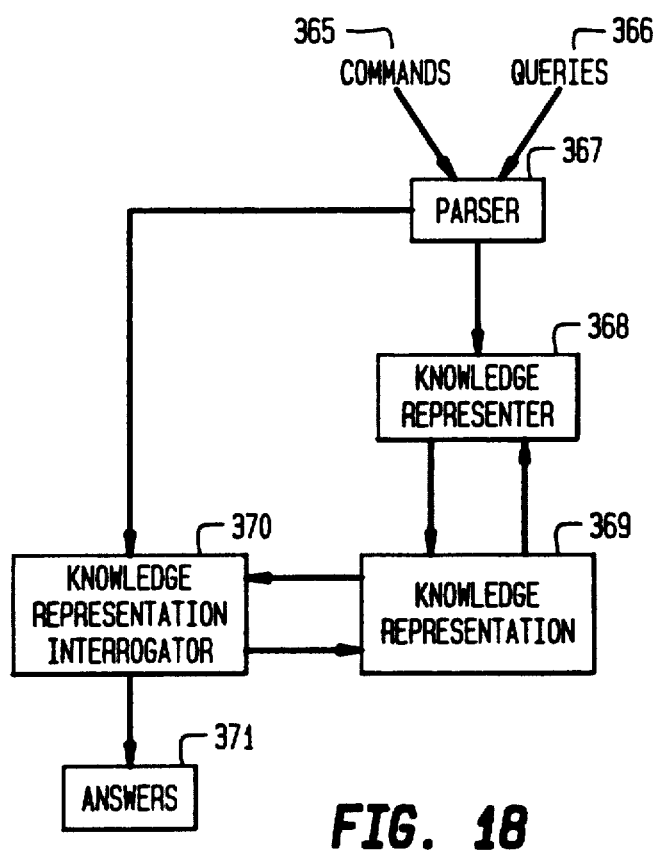
FIG. 18—The Knowledge Representation Interrogator.

Referring to FIG. 18, the knowledge representation interrogator [370] allows a user to request information and make queries [366] concerning the network of relationships (the knowledge representations [369]) stored in the meta-database. This interrogation can request information concerning either child or parent links or attribute information stored in the various frames. Thus, child links are followed to determine what ancestors exist for any particular layer in the database. During the course of such query, intermediate layer command frames can be viewed to determine command and processing information. Additionally, product frames can be viewed to determine the end use of any particular layer. When an original input layer is found at the end of a child link, the source description frame may be accessed to retrieve attributes concerning the original data sources. In this fashion the knowledge representation interrogator allows a user to determine the lineage of any final output product by tracing such lineage back to the original input layers. Further, determinations concerning the quality of the information (e.g. via analysis of the accuracy slot or agency slot of the SDF) and transformations contributing (e.g. via a CF) to a final product can be made.

Questions concerning the effect of updates to a particular source input layer (i.e. original input to system containing SDF) can be traced through the integrated representation of the data in the GIS database to all the affected output products using the invention. In such a case, parent links are queried to determine the decendants of any particular layer. In this fashion, a user can determine what output products will be affected by a change to an input product.

The knowledge representation interrogator can access the integrated cartographic model to allow a user to answer the questions:
What layers are shared between applications?
What application products are based upon shared layers?

These questions can be answered by the invention if shared nodes exist. Shared nodes [400] have more than one parent link emanating from them [401, 402] (FIG. 17). If shared nodes exist, the latter question can be answered by following parent links until no further parent links exist (i.e. a final product). At that point the characteristics of the final product(s) are printed or otherwise provided to the user. If the user desires to answer the question: What original input contributed to the shared node, child links are followed from the shared node until an original input is located (i.e. no child links). When such a layer is located, the characteristics are of the original input are printed or otherwise provided to the user.

Rule Based Processing

The ability of the LIP to access information concerning parent and child links and the SDF, CF, and PF attributes makes it possible to create a set of rules identifying ("flagging"), prohibiting, suggesting fixes for, or automatically fixing faulty operations and incompatible data layer combinations. This rule based process is based upon the ability of the LIP to access the knowledge representation to make inferences concerning the information stored in the GIS database and user requested operations which change the contents of the spatial data layers it contains.

For example, when an attempt is made to combine incompatible data layers to create a new data layer, inaccurate information can result. When such a combination of incompatible data layers is attempted the user command can automatically be tagged with a "flag" by the LIP designating that data incompatibility exists and that inaccuracies may result in the resulting data layer if the command is permitted. Once flagged, the LIP may automatically prohibit the combination of incompatible data layers thereby protecting the spatial accuracy of all output layers.

With the LIP knowledge representation as working memory (Charnaik et al., 1987), rule based inferences would determine the validity of user specified database transformations. Each command is associated with a set of rules in the rule base specifying a valid working memory context for the command's operation. As each command is processed the knowledge representation interrogator serves to evaluate each rule's left-hand side ("if" side). If the command violates the rules, an error is found. This error can then be documented and/or corrected.

As a further enhancement to the above process, the LIP, when it detects an attempted combination of incompatible data layers can automatically suggest the appropriate transformations to be applied to a particular layer to make the layers involved in the combination compatible and thus eliminate the problem. Thus, when an attempted combination of layers is made, the LIP examines the meta-database's automated adapted cartographic model specifying the lineage to determine if the projections, scales, or other characteristics of the layers to be combined are compatible. In addition, if a combination of layers having incompatible attributes is attempted, the LIP can detect the attempted prohibited combination and automatically apply the appropriate transformations to one of the input layers thereby creating input layers of compatible characteristics which can subsequently be combined in an appropriate fashion.

For example, when the LIP detects an attempted combination of layers having different map projections, it can automatically suggest the appropriate inverse and forward map projections to be applied to one of the layers to make the two layers involved in the transformation compatible and thus eliminate the problem. Thus, when an attempted combination of layers is made, the LIP examines the knowledge representation of the automated adapted cartographic model specifying the lineage of the input layers to determine if the projections of the inputs are the same. If a combination of layers of dissimilar projections is attempted, the LIP can detect the attempted prohibited combination and 1) flag the problem, 2) inform the user about the problem, 3) suggest the appropriate inverse and forward projections, and 4) automatically apply the appropriate inverse and forward projection algorithms to one of the input layers thereby creating input layers of the same projection which can subsequently be combined in an appropriate fashion.

When the user enters a command, the rules associated with that command are accessed and tested. The testing of each rule is based upon knowledge structure interrogation functions in order to match the "if" side (i.e. the left hand side) of the rule. For example, if the user desires to overlay two layers, a rule associated with the overlay command might be as shown in FIG. 19.

In order to determine if the two "left hand side" criteria are true, the inference mechanism of the rule based processor requires the knowledge interrogation functions to search the lineage of the layers to be combined. In the example given, the lineage of the layers to be combined is searched to determine if their respective scales and projections are equal.

Scale and projection characteristics of the maps to be combined can be from the ancestors of these maps. The most recent scale and projection change is accessed through a backward search through the command frames of ancestral layer (nodes). The most recent changes become the scale and/or projection of the map in question. If no change in scale and projection are found in the CF's, then the initial scale and projection from the SDF's are inherited by the map in question.

This search of lineage would trace back to the SDF of the input layers associated with the layers desired to be combined to access their scale and projection slots and to determine if they are equal. If they are not, the left-hand side of the rule (FIG. 19) would fail and the right-hand side would never be executed. Thus the layers would not be overlaid. If the scales and projections are equal, the left hand side of the rule is satisfied and the command is permitted.

In general, the lineage tracing process would be used for any rule requiring information concerning a layer's attributes (e.g. features, scale, projection, accuracy, etc.) For example, if the user wishes to execute the command:

overlay MAP1 and MAP2 for MAP3

If MAP1 were the base map (i.e. the map, the scale and projection of which are used for all transformations to the database's layers), the rules for insuring a valid overlay would appear in FIG. 20.

In this example, the inference mechanism would first try to satisfy Rule 1. Rule 1 would fail if the two layers were not of the same scale and projection. If the layers were of the same scale and projection, the command would be permitted.

If Rule 1 failed, the inference mechanism would attempt to satisfy Rule 2 (i.e. Are the layers of different scale?). If the layers were of the same scale, Rule 2 would fail. Otherwise, Rule 2 would be invoked and a function would be called to rescale MAP2 to the scale of the basemap MAP1.

The inference mechanism would again try Rule 1. If MAP1 and MAP2 were not of the same projection, Rule 1 would again fail and the inference mechanism would try to satisfy Rule 3.

Rule 3 would be invoked if the projections were not the same. The LIP would first apply an inverse projection to MAP2. It would next apply MAP1's projection to MAP2 thus making the two projections the same.

The inference mechanism would again attempt Rule 1. This time all the requirements of Rule 1 would be satisfied and the command OVERLAY would be executed.

It can thus be seen by one skilled in the art that many such rule-based decisions can be made in the current invention. Such rule-based decisions include:

Detect, prohibit the overlaying of layers of different spatial extent

Detect, prohibit and/or fix overlaying of layers of different projections

Detect, prohibit and/or fix overlaying of maps of different scales

Detect and prohibit transformations that overlay layers that are derived from sources of incompatible scales Detect and prohibit changing scale of maps beyond a user specified range Detect and prohibit combination of layers having incompatible accuracies Detect and prohibit algebraically combining layers of different data types (e.g. nominal and ordinal)

Detect and prohibit combination of layers consisting of incompatible radiometric data Detect and prohibit overlaying of layers having incompatible spatial coverage The above examples are but a few of the decisions of which the current invention is capable. The invention also uses the above rules to permit the desired combinations of data to occur. In a similar vein, the invention can merely notify the operator of the attempt of a prohibited operation, and/or flag the resulting combination to notify a user that the final representation is a result of some prohibited operation. The invention can suggest the insertion of GIS manipulations (transformations) to the input layers so as to make them compatible prior to the execution of the command in question. In addition the invention can automatically insert GIS manipulation operations to transform the desire inputs into layers having compatible characteristics for a subsequent transformation by the command in question. In addition the rule-based processing by the LIP has capabilities for propagating accuracy information from input layer attributes to output layers. Such rules may make use of error propagation techniques discussed in Greenwalt and Shultz (1962) or simply propagate the accuracy of the least accurate input layer to the output layer. Rules such as those described above are added to the LIP by the user as needed. This option of adding rules to the system is noted in FIG. 21 and is an integral part of the LIP and its functions.

Referring again to FIG. 13, the invention is controlled by a program that is started [60] with a user's command [61]. The invention determines if the command is one it recognizes [62]. This allows the invention to determine if typing errors, syntax errors, erroneous commands and other illegal commands have been given by the user. If the invention detects a command that it does not recognize, it provides the user with an error message [63] and returns the user to the beginning of the program [66] to allow input of the next command to the invention. If the invention does recognize the command given, the invention determines if the command is one to exit the program [64]. If the command is not an exit command, the invention processes the command [65] (more detail concerning the "process command" step is provided in FIG. 22). After the command is executed, the invention gets the next command from the user [66] and again checks to determine if the user wishes to exit the program. This repetitive command acquisition and check concerning the desire to exit the program continues until the user provides an exit command to the invention, at which time the processing ceases [67].

Figure 22:
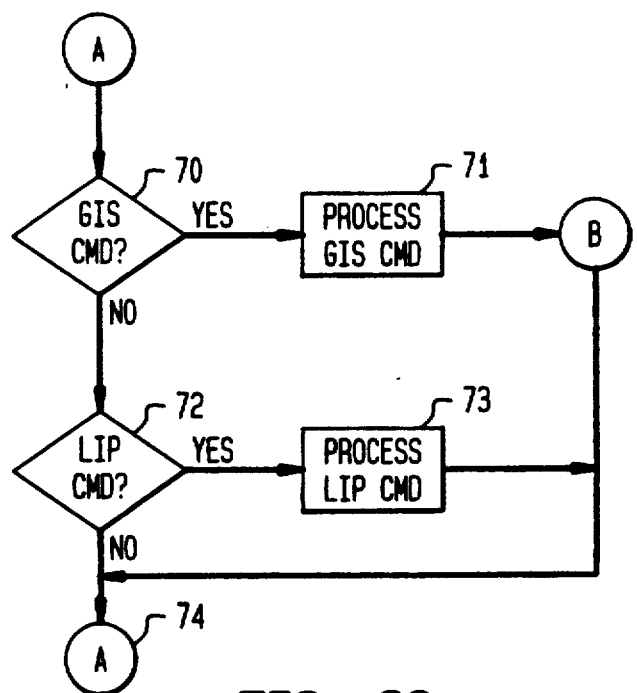
FIG. 22—"Process Command" flow chart.

Referring to FIG. 22, the "process command" step [65] is described. The invention first determines if the command being supplied by the user is a GIS command [70]. If the command is a GIS command, the invention processes it [71] (more detail concerning the "process GIS command" step is provided in FIG. 23). If the command provided is not a GIS command, the invention determines if the command is directed to the Lineage Information Program "LIP" [72]. If the command is directed to the LIP, the invention processes the command [73]. After processing either the GIS command or the LIP command the invention returns (FIG. 13) to obtain another command for processing.

Figure 23:
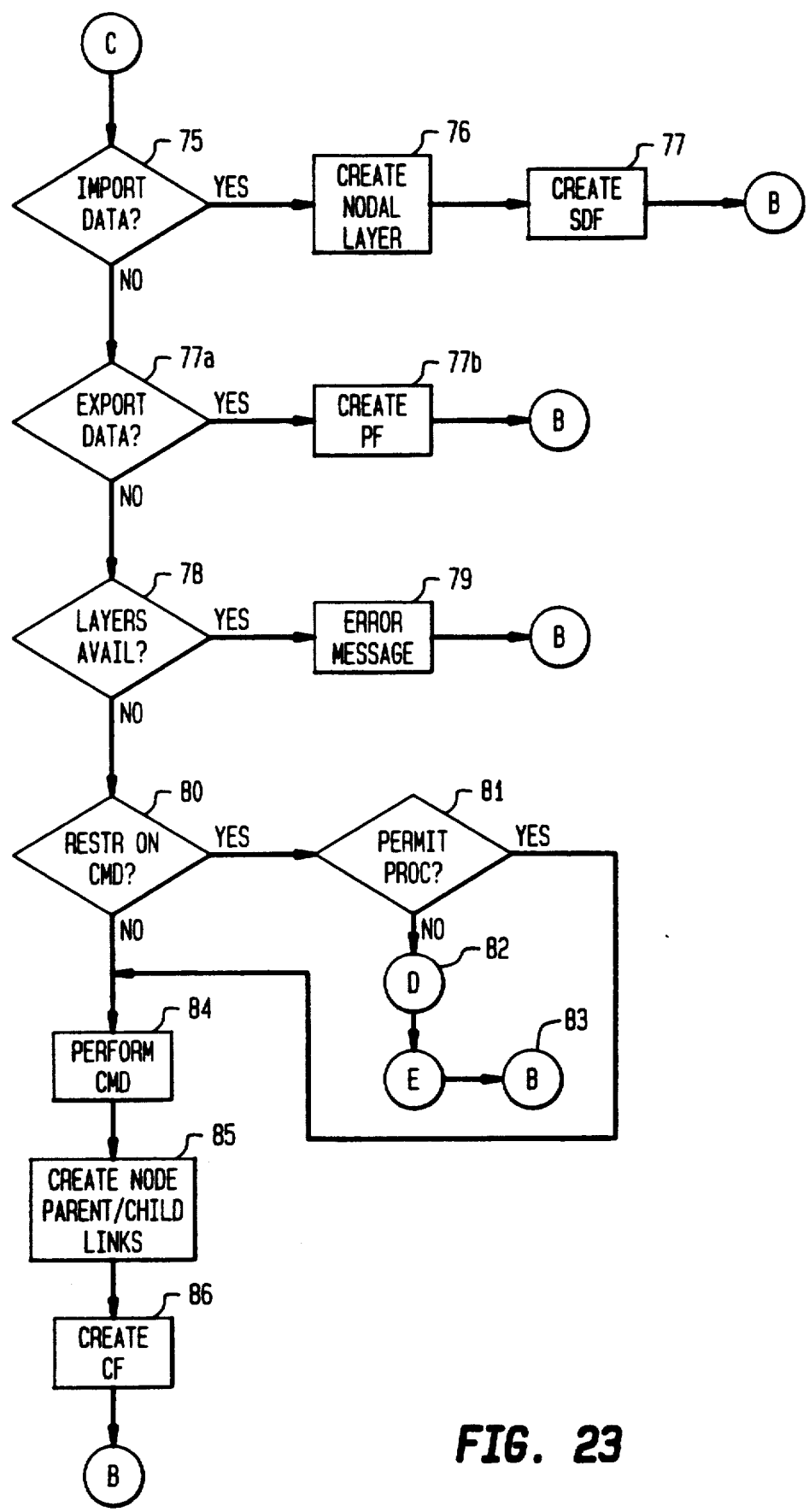
FIG. 23—"Process GIS Command" flow chart.

Referring to FIG. 23, the "Process GIS Command" step [71] is described. The invention first determines if data is to be imported into the database [75]. Importation of data occurs when the user obtains information from another database or another source. If data is to be imported, the invention creates a nodal layer in the meta-database [76] and creates a SDF for the nodal layer [77]. After the user fills the SDF slots with the required information, the invention thereafter returns to the process command step at "B" which in turn returns the processing to the main driver at "A" to obtain the next command [66]. If the command does not require the importation of data, the invention determines if the command requires that data be "exported" [77a] (i.e. a product of the GIS). If the command calls for the creation of a product of the GIS, the invention creates a product frame for the product in question [77b]. Once the PF is created, the invention thereafter returns to the process command step at "B" which in turn returns the processing to the main driver at "A" to obtain the next command [66]. If the command is not one to export data, the invention next determines if data layers are available for the desired processing [78]. If appropriate layers are not available, an error message is sent to the user [79] and the invention returns to the process command step at "B" which in turn returns the processing to the main driver at "A" to obtain the next command [66].

Figure 24:
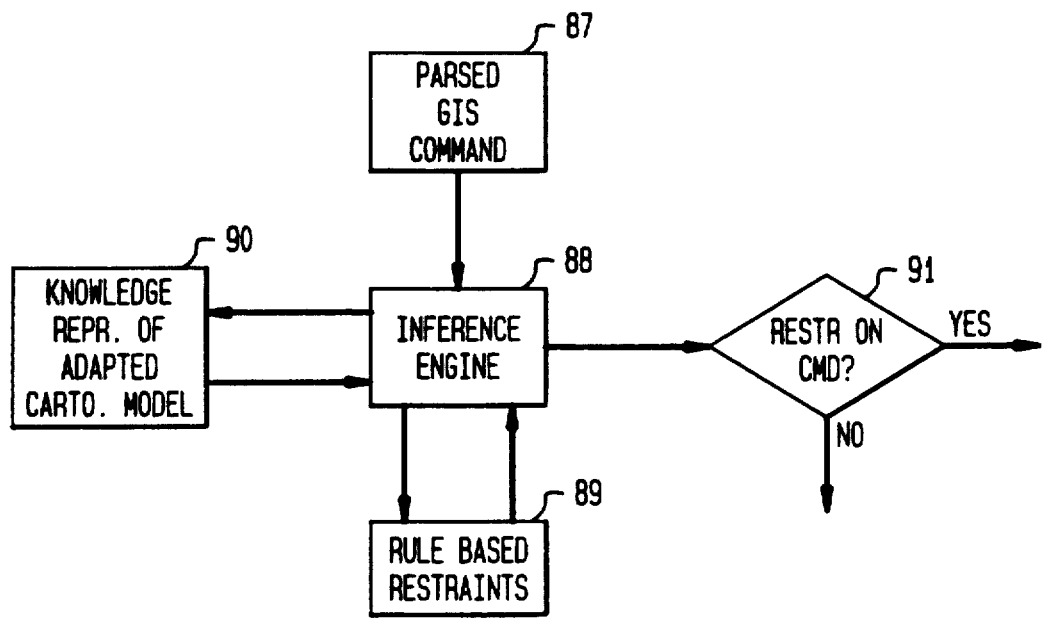
FIG. 24—"Restriction on Commands" flow chart.
Figure 25:
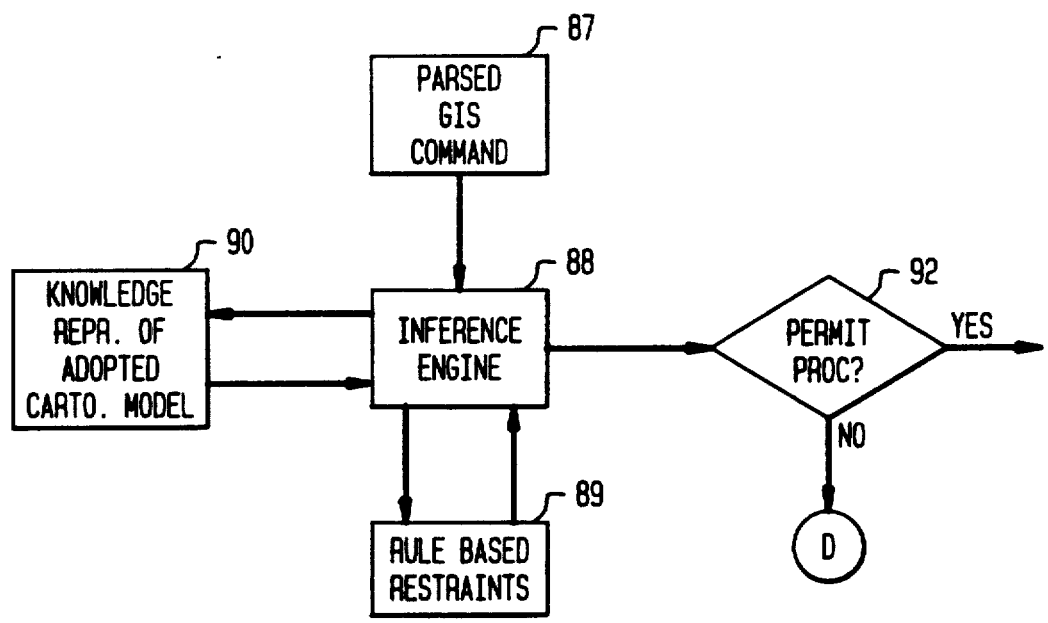
FIG. 25—"Permit Processing" flow chart.

If appropriate data layers are available, the invention determines if there are any restrictions on commands [80] (more detail concerning the "restriction on command" determination is provided in FIG. 24). If there are no restrictions on commands, the command is performed [84], the invention creates a nodal layer for the data layer resulting from the processing requested, parent and child links are created as necessary [8] and a command frame describing the operation and parameters used to create the new data layer is created [86] in the meta-database. If restrictions on commands are present, the invention determines if processing can take place given the restrictions [81]. If processing can take place, the command is performed [84], and appropriate nodes, links, and frames are created [85, 86] in the meta-database. If the requested processing cannot be permitted given the restrictions placed on the commands, the invention attempts to suggest a "fix" for the problem or seeks to correct the problem in an automated way [82] (more detail concerning the "permit processing" decision is given in FIG. 25, and more detail concerning the "suggest fix/fix" step is provided in FIG. 26). Once all problems have been corrected the invention returns (FIG. 13) to obtain another command for processing.

Restrictions on commands [80] are determined as described in further detail in FIG. 24. The parsed GIS command [87] is provided to the inference engine [88] which is a program of steps for analyzing rules in light of known data to draw conclusions in a similar fashion to the way a human applies logic to solve a problem. In short, the inference engine is a program that uses logic to make inferences about data presented to it. (Buchanan and Shortliffe, 1985). The inference engine reviews rules that relate to the GIS command desired to be executed by a user.

The rule based restraints [89] to be reviewed by the inference engine consists of criteria for valid data layer transformations. Each command is accompanied by a set of rules that specify the valid context in which the rule can be executed (e.g. FIG. 20). If the user command and associated modifiers violates the criteria under which the command can be applied, an error is found to exist by the invention.

As each command is entered by the user, rules associated with that command are tested against the command and command modifiers entered by the user. The testing of each rule is based upon the knowledge interrogation function of the invention which attempts to match the user input command to the "if" side (i.e. the left hand side) of the rule. If the criteria of the left hand side of the rule are satisfied, then the right hand or "then" portion of the rule can be executed If the left hand side of the rule is not satisfied, the "then" side (i.e. the right hand side) of the rule is not used.

Figure 26:
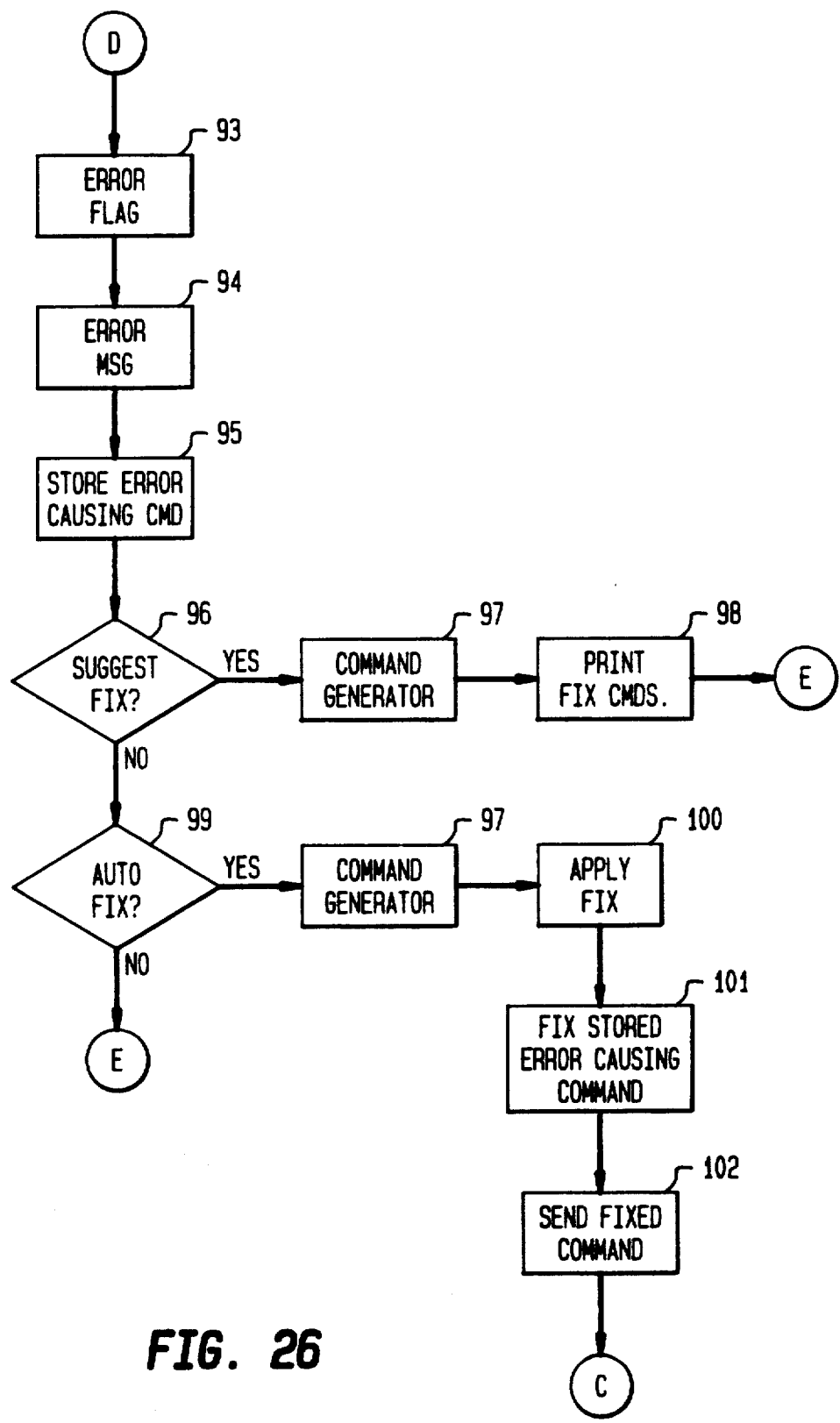
FIG. 26—"Suggest Fix/Fix" flow chart.

These restraints on commands are based upon rules and are stored in a file of "rule based restraints" [89]. The inference engine also seeks information from the knowledge representation of the adapted cartographic model [90] which is a meta-database that describes the nodes, links and frames that relate to the data layers within the GIS database that are to be processed by virtue of the user commands input by the user. (FIG. 11, [350]). By considering the rule based restraints [89] in light of the data from the knowledge representation [90], the inference engine [88] can conclude whether there are restraints on the command desired to be executed. This information is provided to the decision step [91] that makes the tinal determination whether or not restrictions on the command are present. The decision on whether to permit processing [81] is described in further detail in FIG. 25. Again the same parsed GIS command [87] is provided to the inference engine [88]. The inference engine again determines what if any restriction on the execution of the desired command exist by examining the file of rule based restraints [89] relating to the desired command in light of information from the knowledge representation of the adapted cartographic model [90]. When the inference engine determines that the processing can or cannot take place in the requested fashion, this information is provided to a decision step [92] which in turn allows processing to take place, or denies the requested processing and sends the requested processing command to the "suggest fix/autofix" step (FIG. 26 [96, 99]). If processing is permitted, the command is performed [84] and appropriate nodes, links and frames are created [85, 86].

When it is determined that a command cannot be executed due to the restraints placed upon the command in light of the knowledge representation concerning the spatial GIS database, the invention attempts to either suggest a fix for the problem or actually fixes the problem in an automated way (FIG. 26). The invention first sets an error flag [93] and notifies the user that an error in the execution of the command was encountered [94]. Thereafter, the invention stores the erroneous command [95] for later action. This action is taken because the invention assumes that the user would like to execute the command once the problem with the data to be processed is corrected. The invention next determines if the user would like system generated suggestions concerning a fix to the situation [96].

If the user desires suggestions for fixing the problem, a command generator [97] determines the appropriate commands to fix the problem and prints the appropriate commands for the user [98]. Thereafter the invention returns to the initial program (FIG. 13) to obtain another command for processing, which command may be derived from those suggested by the invention. If the "suggest fix" step is not to be invoked by the user, the invention next determines if the users desire to have the problem "fixed" thereby allowing the command to be executed [99]. If the user does desire the command to be fixed in an automated fashion, the command generator [97] is invoked, only this time, the suggested fix is actually applied to the command and the data layers to be manipulated by the command [100].

Once the data layer(s) in question is rendered in a form that can be operated on by the stored command, the stored command itself is adjusted [101]. The command must be adjusted since the correction of the data layer in question may have resulted in a newly created data layer having different frame attributes as well as parent and child links. This change in identification of the data layer must be reflected by a change in the command calling the corrected data layer. Thereafter, the fixed command is sent [102] to the "process GIS command" step for execution (FIG. 23).

Figure 27:
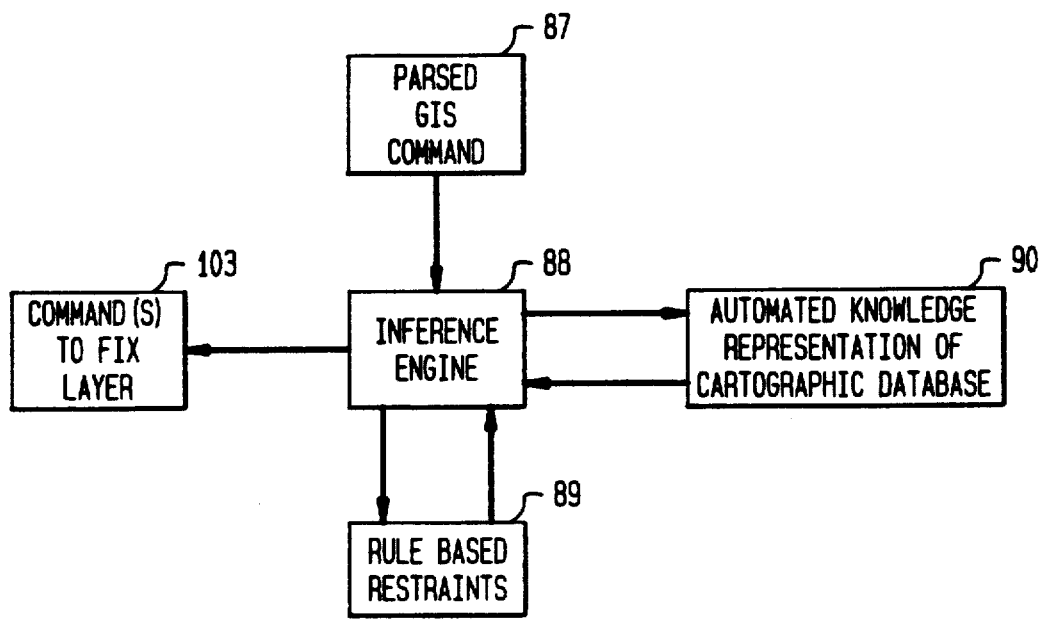
FIG. 27—"Command Generator" flow chart.

The command generator [97] is shown in FIG. 27. The parsed command [87] is again sent to the inference engine [88] which relies upon rule based restraints associated with the command in question [89] and taken in light of the knowledge representation of the automated adapted cartographic model [90] to determine corrections to both the command and to the layer(s) to be operated on by the command. These corrections are found in the right-hand side of the rules whose left-hand side detects the problem. For example, see the "then" part of rules in FIG. 19 and FIG. 20. These corrections can either be implemented, thereby correcting the failed situation, or merely suggested to the user for later implementation in the main driver program.

If the user is not going to enter a GIS command but rather desires to enter rules into the system or to make lineage inquiries, such user is actually entering LIP commands for execution.

Figure 21:
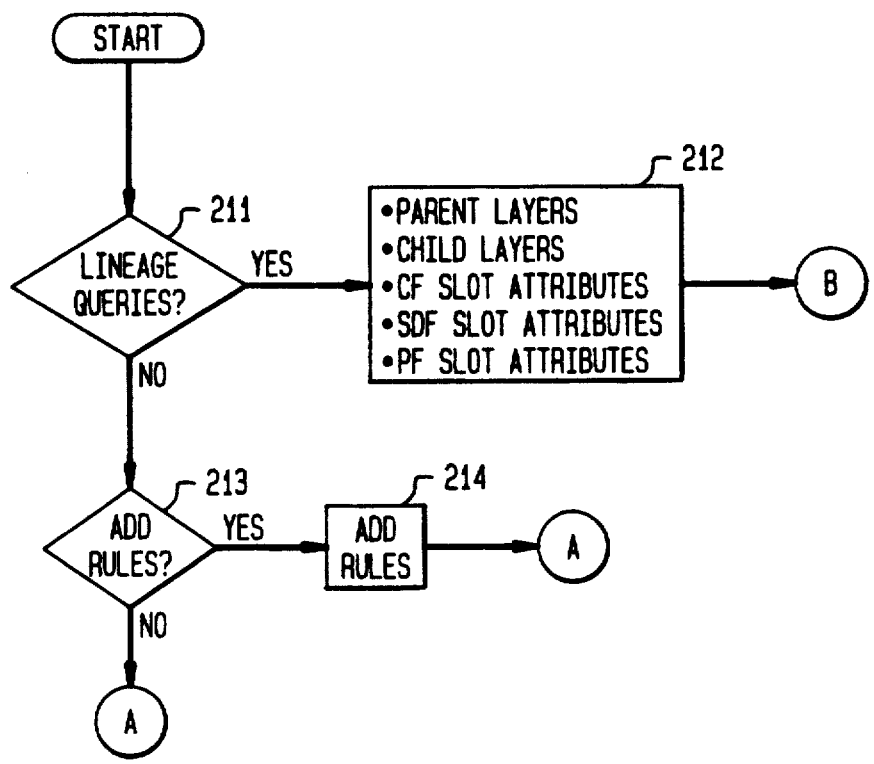
FIG. 21—Process LIP command.

Referring to FIG. 21, the Process LIP Command is described. Once the invention determines that a LIP command has been provided by the user (FIG. 22, [72]) the invention proceeds to process the LIP command given (FIG. 22, [73]). This process begins by the invention first determining if a lineage query is being made by the user [211]. If such a command is given, the invention proceeds to process any of the series of commands that call for parent layers and links to be followed, child layers and links to be followed, information to be extracted from the slots of command frames, source frames, and/or product frames [212]. If the LIP command is to add rules to the knowledge representation [213], the invention proceeds to allow the user to enter rules into [214] into the file of rule-based restraints [89]. Once the rules are added, the invention returns the user to the beginning of the program to enter further commands to exercise the invention (FIG. 13, [66]). In this fashion, the user can enter LIP commands to trace lineage as required or to increase the rule base of the invention through the addition of rules for subsequent processing of GIS commands Preferred Embodiment The LIP operates on a variety of hardware systems. In the current embodiment of the invention, an IBM AT "clone" is used having an Intel 80286 microprocessor and 6 megabytes of random access memory (RAM). The Common LISP (Steele, 1984) language is used for the current implementation although as other langauges are amenable to the creation of the metadatabase of this invention, such languages could also be employed to operate on the data layers as described in this patent application. Further, the invention will be equally effective if run in conjunction with mainframe computers (e.g. marketed by such companies as IBM and Unisys), minicomputers (e.g. marketed by such companies as Digital Equipment Corporation, PRIME and Data General), and work stations (e.g. marketed by SUN, Apollo, Tektronix, Digital Equipment Corporation, IBM), or personal computers (e.g. marketed by Apple, Macintosh, IBM PC's, AT's, RT's, PS-2 and the like). In essence any computer capable of running a multiple-process based operating system, concurrent processing, parallel processing (e.g. UNIX, OS/2, VMS, PRIMOS, etc.) would be a suitable central processing unit with which to run the software. Thus, while a particular piece of hardware has been selected on which to run the software which is an integral part of the invention, one skilled in the art will immediately realize that other hardware of compatible characteristics may also be employed to allow the data processing, metadatabase creation and information query capability described herein to occur.

The LIP software is written in the List Processing ("LISP") language. The examples presented in this patent application are therefore written in that language. However, as other languages are amenable to the meta-database concept of this invention, the application should be read expansively to include implementation of the methodology described herein in any such language.

As previously stated, the LIP undergoes a knowledge acquisition process whereby changes to the layers in a spatial database and information concerning those layers is obtained and stored in a meta-database as a result of user manipulations of a spatial database system. This information is extracted via a three-part knowledge acquisition process Thus, after accepting each command, the LIP (1) parses the commands, (2) models the parent/child relationships between input/output layers manipulated by the command, (3) proceeds with knowledge representation integration.

Commands from a user are parsed by the LIP. In performing the parsing operation, the LIP uses symbolic pattern matching. A series of pre-stored command language templates are compared with a user's command input until a match is found. There is a command template for each version of each command in the GIS command language When a match is found, the LIP proceeds in its processing in accordance with the command language template that is found to be a match to the user input.

The method and system of lineage information processing is demonstrated by the following example: a user desires to create a map which identifies the steepest locations along a down hill path which would in likelihood be the drainage direction for water flowing in that area. Thus, a command "DRAIN" would create an output map ("outmap") which is derived from various starting locations ("inmap") and a map of surface elevations ("inmap2"). The template stored by the system for the DRAIN command is:

DRAIN (? inmap) OVER (? inmap2) FOR (? outmap)

An example of a DRAIN command line input by a user is:

DRAIN HYDROLOGY OVER ELEVATION FOR DRAINAGE

The parser must first use a match function (FIG. 28) to compare both the template and the users command line (FIG. 29).

The order of the key words in a command template is important. Thus, the DRAIN command template (FIG. 29) the words "over" and "for" are used for comparison With the user's command line input. If these key Words are not found in the place specified by the template in the user's input, the command fails. Thus, the command "DRAIN MAP1 FOR MAP2" would be an example of a command that would fail to match the DRAIN command template (FIG. 29). This failure would occur when the match function attempts to compare the key work "over" in the template with the key word "for" in the command input.

Each legal command in the database contains a template for that command. When a command is given, the parser looks at each command template in the database. When a match for given command template fails, the parser moves on to the next template and attempts to match the command with that template. If a command does not match any of the templates stored in the database the user is informed of an error in his input.

The match function also includes a capability to assign information from a user's input for use in subsequent knowledge representation and interrogation. This is accomplished in the following fashion. Template key words that are surrounded in brackets and begin a "?" are assigned corresponding values from the users command line input. Therefore, in FIG. 29, "?inmap" tells the map function to assign the map of starting locations in the DRAIN command to the variable name "inmap". In a similar fashion, "?inmap2" assigns the name of the map of surface elevations to the Variable "inmap2." Finally, "?outmap" is used to assign the output layer of drainages to the variable "outmap".

When the parser is ale to match a template to the user's input command, the knowledge representer (also known as the GIS command processor) or the knowledge interrogator [211, 212, 359]) is called. GIS commands that manipulate the spatial database call for the knowledge representer [362, 357, FIG. 23]. When the knowledge representer is used (i.e. a spatial database manipulation is called for) it is passed information extracted from the match function's assignment capability of the parser. Such information would include: (1) which map layers are inputs, (2) which map layers are outputs, (3) which commands created the transformation of inputs to outputs, and (4) what command modifiers were used and what were their values.

As previously stated the LIP uses semantic networks and frames to represent knowledge in the meta-database. The semantic network structure deals with the parent/child relationships between input/output data layers resulting from transformations and manipulations of the spatial database. "Frames" provide a means for characterizing attributes concerning sources of information (source description frames), and transformations that created data layers in the database (command frames), and final uses of output products created in the database (product frames).

When a parser matches a command line input to a particular template, the knowledge representer is called. The knowledge representer creates parent and child links between the input and output layers. For example, the command:

SPREAD MAP1 TO 70 FOR MAP2 is compared against the template:

spread (? inmap) to (? to-value) for (? outmap).

When the parser matches the command with the template, MAP1 will be associated with the variable "inmap." The command modifier "70" will be identified with the "to—value" in the transformation output layer, MAP2 will be identified with the variable "outmap". Once this match is made the parser then calls the knowledge representer which creates parent/child relationships between the various inputs and outputs used by the command. The knowledge representer next creates the parent and child links using the commands "ADDPARENT" and "ADDCHILD". The ADDPARENT command establishes that the data layer associated with "inmap" is the parent of the data layer associated with the layer "outmap". ADDCHILD establishes that the layer associated with the layer "outmap" is the child of the layer associated with the layer "inmap" thus the ADDPARENT command creates the parent link from "inmap" (the parent) to "outmap" (the child). Thus "inmap" is the parent of "outmap".

The ADDCHILD command creates a child link from outmap (the child) to "inmap" (the parent). This implies that outmap is the child of "inmap". These two functions are illustrated in FIG. 30.

Figure 31:
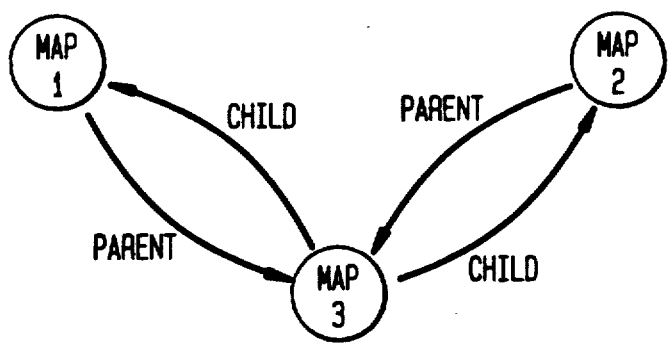
FIG. 31—Parent/child relationship among MAP1, MAP2, and MAP3.

When a command creates a layer from a set of input layers, the knowledge representer is called to create parent links from each of the inputs to the resulting output. Additionally, child links are created that link the output layer to each of its parents, the input layers. For example, when the match function is passed the text:

SPREAD MAP1 TO 70 THROUGH MAP2 FOR MAP3 and the template:
spread (? inmap) to (? to-value) through (? inmap2) for (? Outmap)

the following knowledge representation commands are triggered:
ADDPARENT inmap outmap
ADDPARENT inmap2 outmap
ADDCHILD outmap inmap
ADDCHILD outmap inmap2
These commands make MAP1 and MAP2 parents of MAP3 and MAP3 the child of MAP1 and MAP2. This relationship is illustrated in FIG. 31.

As previously described, three frame types, the SDF, the CF, and the PF are created by the invention. These three frame types are created and filled with information used by the knowledge representer and are associated with particular nodes representing GIS database layers in the meta-database. These frames are subsequently used during the course of making inferences concerning the layers in the database.

When the user desires to enter source data into the database the parser calls the appropriate SDF creation routine to create the new data file. Thus the LIP would call the SDF creation routine which would request the name of the data file, the features contained within the data layer, the date of the source, the agency responsible for the source, the scale of the source, the projection of the source, and the accuracy of the source. Thus the source description frame (FIG. 32) would be created by the commands noted in FIG. 33. Upon completion of the input of various sources, a list of original input layers is maintained by the invention.

Each time a layer is updated by a transformation or manipulation, a command frame is created. Again, after a parser recognizes a command, and the resulting transformation is determined to be permitted the knowledge representer creates a semantic link between child and parent layers, thereafter creating a command frame for storing information about the transformation.

The knowledge representation for slots of a command frame is created with a command called "FPUT" which associates a value with a particular attribute in the frame. The information stored in the frame is retrieved using a command called "FGET." In creating the command frame, the parser extracts command parameters and modifier values and assigns those to variables which it passes to the representer which creates the frame using the FPUT command. Each command frame has its own set of associated command modifier "slots." For example, the command frame (FIG. 34) for the command "RENUMBER" contains associated slots that include "assigned", "to", and "through." Each such slot has a value assigned to it by the FPUT command. Once the RENUMBER command is input by a user, it is matched by the parser with a template which extracts the command and command modifier values. The slots of the command frame for RENUMBER are filled with the appropriate values which are assigned to the slots by the parsing command. (FIG. 35).

When a database layer is designated as a final product by a user exporting or outputting it, a product frame is created. The product frame conceptually appears in FIG. 36. The knowledge representation for this command frame is created with the commands noted in FIG. 37.

As final products are created and documented with product frames, a list of final product layers is maintained by the LIP.

Knowledge representations of a series of applications are integrated to form a unified knowledge representation that expresses how various layers in a database relate to one another. This knowledge integration is accomplished automatically by the LIP. To accomplish this the knowledge integration, routines first determine which layers are shared between applications. The applications sharing a particular layer are joined at that layer. Thus multiple applications are integrated. This process also removes redundancy from the knowledge base in that the lineage of each database layer is stored only once wherever possible In addition, the integrated knowledge base allows inferences to be made between final output products of multiple applications.

The knowledge integrator relies upon the list of all final products in the database that is maintained by the knowledge representer. The algorithm to integrate two applications is outlined in FIG. 38.

Knowledge interrogation allows a user to obtain answers to queries concerning the lineage of the information in the database. In order to query information in the database, two capabilities are required: the semantic network of parent and child links must be traversed, and frames that store information about sources, commands, and products must be accessed. Together these capabilities allow inferences to be made. Five sample queries will be addressed in the following example: (1) what is MAP1, (2) is MAP1 a parent of MAP2, (3) what are the ancestors of MAP1, (4) why is MAP1 a parent of MAP2, 5) what are the decendants of MAPN and 6) what are the input scales of MAPW?

If a user requires the answer to the question "what is MAP1? "the LIP will answer with a list of layers for which MAP1 was an input. If MAP1 has no parent links, the query will respond with a list of input layers that were input to the transformation that created MAP1. This query is represented by the commands noted in FIG. 39. Sample output of the question "What is" layer in FIG. 36 is shown in FIG. 40.

If the user desires an answer to the query "is MAP1 a parent of MAP2" the LIP checks to determine if MAP2 is a child of MAP1. If this is not the case, the LIP next inquires if MAP1 is an ancestor of MAP2. In this case the children of MAP1 are examined to see if any of them are parents of MAP2. This query is recursively run on the grandchildren, great grandchildren of MAP1, and so on until the function finds, or fails to find MAP1 is an ancestor of MAP2. The commands to perform a search of ten generations of MAP1 are provided in FIG. 41. Sample output of this query is FIG. 42.

If the user desires to answer the query "what is the lineage of MAP1" the child links of MAP1 are followed until a layer is reached which is devoid of child links. Such a layer is an original input to the database system. As each intermediate layer is reached (i.e. one that is not a source layer) that layer is reported as part of the lineage of MAP1. In addition, the command frame of each intermediate layer is accessed and a report is made of the command that created the intermediate layer. This process continues until source layers are reached. At that point a report is made that the source layer is an original input layer to the system. The commands performing this query are provided in FIG. 43. Sample output of this query is FIG. 50a.

If the user desires an answer to the query "why is MAP1 a parent of MAP2" the parents of MAP2 are traced until MAP1 is reached. As the LIP proceeds from child to parent, a report is made indicating the relationship between parent and child across one generation. At an original input the LIP makes a report that the original input is the parent of the child in question. Thereafter the report is made that MAP2 is the child of MAP1 and MAP1 is the child of some other MAP etc. In addition, tests are made to determine if the two layers are in fact the same, in which case an error message is issued. If MAP1 is not an ancestor of MAP2 then an error message is issued. The workings of this function is indicated in FIG. 45. Sample output of this query is FIG. 46.

If a user is interested in knowing which final products are the result of a particular original input, the LIP would traverse the semantic network from original input through intermediate layers to final products. As each intermediate layer is encountered, the LIP searches for any final product frames that are associated with that layer. If none exist, then that intermediate layer is not used as a final product and no report is made, whereupon the next set of links are traversed to the next group of layers. If a final product does exist, the final product frame is called and its contents are reported to the user. The commands to perform this function are shown in FIG. 47. Sample output from this query is shown in FIG. 48.

The LISP code showing the interaction of the parser, the knowledge representer and the knowledge interrogator are shown in FIGS. 49 and 49h. An actual sample interaction with the LIP and associated output is shown in FIGS. 50-50b.

Graphical Representation

Figure 51:
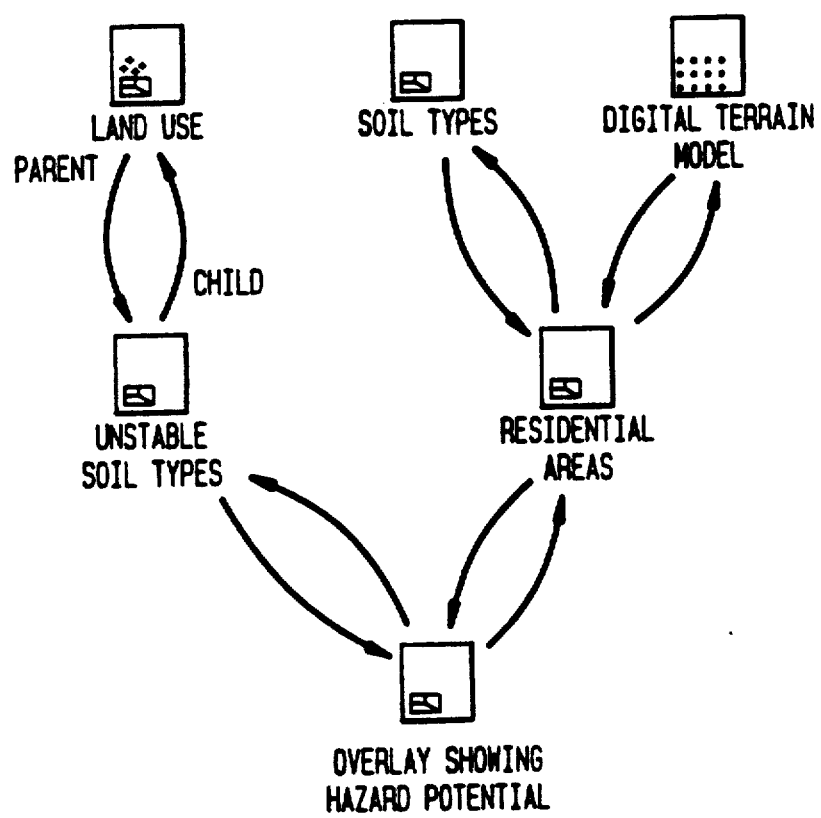
FIG. 51—Sample graphic output from the LIP.

The LIP also has the capability to graphically represent the parent/child relationship between layers in the spatial database. Thus each parent/child relationship is represented by requested parent and/or child links between nodes. An example graphic output showing parent and child relationships is shown in FIG. 51. Each node has its unique identifier. The various links are depicted as arcs with an arrow head pointing to the node that is related. In the case of a parent link, an arrow points to the child node indicating that the node from which the arrow emanates is the parent. In the case of a child link, the arrow points to its parent.

Figure 52:
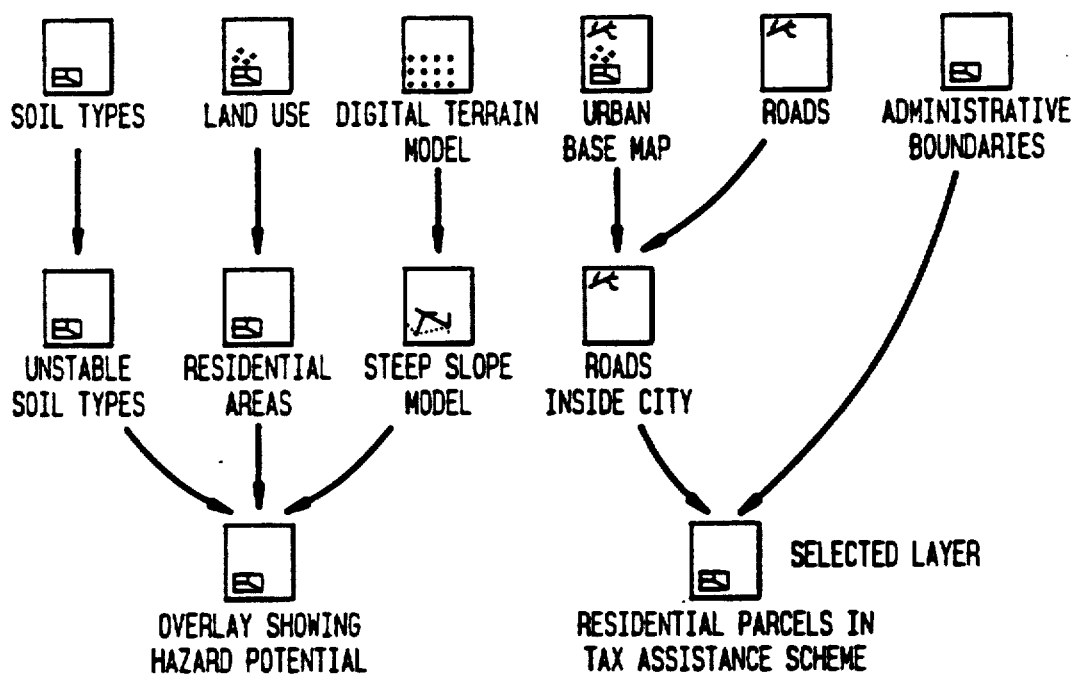
FIG. 52—Sample graphical output from the LIP highlighting ancestral layers.

The user also has the ability to "travel" around and through an integrated knowledge representation of the database. Queries concerned with the lineage of particular layers can be answered graphically. For example the user may desire to know the lineage of particular layer. In response to such a query, the LIP highlights those layers that are ancestors of the layer in question. FIG. 52.

Figure 53:
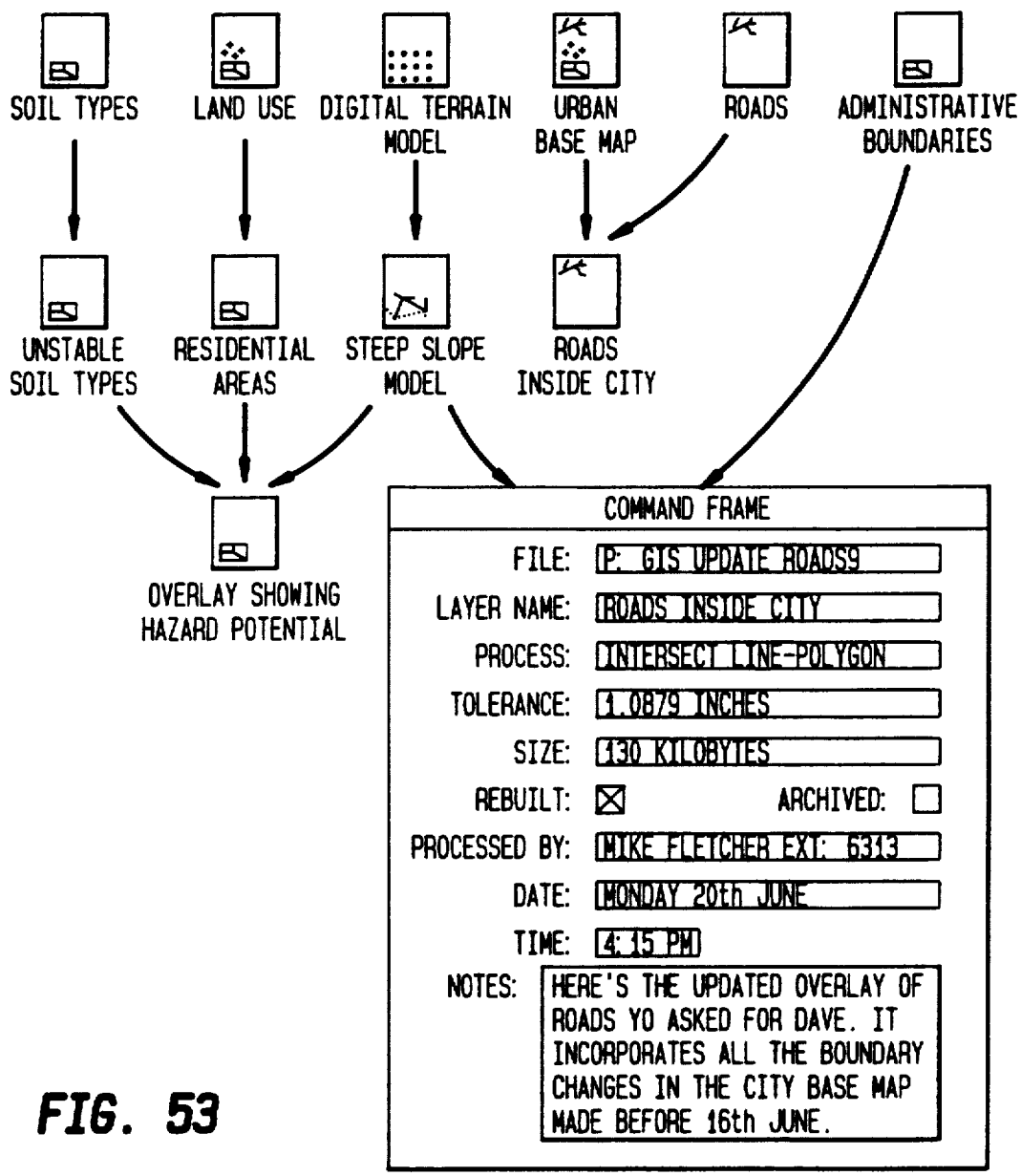
FIG. 53—Sample Command Frame graphical output from the LIP.

If a user desires specific information about a particular layer, the user merely points to that particular graphical representation of the layer and information associated with the source description command or product frames is then accessed. FIG. 53.

Layers that are "shared" may have multiple parent layers and multiple child layers pointing to them. When a user desires to know information concerning the sharing of data layers, the LIP highlights the shared layer.

All final products have associated product frames. When a user desires to know information concerning a final product, the LIP accesses the PF concerning that layer. The LIP can also graphically represent all final products and all intermediate layers that led to the creation of the final product.

SAMPLE APPLICATION

The following example is presented to show the interaction of the user and the LIP. The United States Geological Survey ("USGS") publishes LANDUSE maps which depict many categories of land use within a given area. If a user desires to do an environmental study of wetland areas within such a USGS landuse map, the user starts the LIP by establishing in the spatial database a file for the LANDUSE map. Thus, the user must initially establish the source description frame, or SDF, for the USGS map. The user begins the LIP (in the example the LIP is given the commercial name "Geo_Lineus") which prompts the user to provide either information to the LIP or to ask questions. In the example, the user informs the LIP that the USGS landuse map will be "imported" or input to the spatial database as a new record. The LIP then requests the information necessary to complete the SDF. Thereafter, the user inputs such information as the source name, types of features, date of the source, originating agency, scale, projection, and accuracy. (FIG. 54)

The user next instructs the LIP to create a wetlands map for the environmental study purpose desired by the user. In this example, a number of transformations of the original USGS landuse map are desired by the user.

Referring to FIG. 55, since the USGS landuse map contains many different landuses the user first applies a transformation called "RENUMBER" to the LANDUSE map in order to obtain a map which consists solely of areas that have been categorized by USGS as "wetlands". Thus, the first transformation requested by the user is to renumber the LANDUSE map in order to highlight to wetlands areas and to eliminate any reference to any landuse other than wetlands. In the example, the user is assigning a value of "1" to the categories of the USGS map representing wetlands (12 and 13) and assigns a value of "0" to all other categories of LANDUSE (1-11, 14, 18). In this way, a wetlands map known as "WETUSE" is generated as a result of RENUMBER function.

The user next applies a function called "RADIATE" to the WETUSE map. The RADIATE function creates a buffer zone around all areas of wetlands depicted in the WETUSE map, which buffer zone consists of a width of two grid cells. The map thus created from the WETUSE map and an additional buffer of two cells, is created and called "RADIMAP".

The user next applies an additional RADIATE function requesting a six grid cell buffer around all areas designated as wetlands in the WETUSE map. The results are then called "RAD2MAP". In both instances, assuming the user enters the proper command and does not commit any typographical errors, the LIP responds to the user with the system response "I UNDERSTAND"

The user next desires to combine the two maps, RAD1MAP and RAD2MAP, to create a third map which consists of the summation of the two maps created with the RADIATE command. This resulting map is called "ADRADMAP". In order to create the final desired map the user transforms ADRADMAP into the final product "ADRADMAP1" using the RENUMBER function. In this manner, the buffer is given a final value in a final product different from that of the wetlands use originally depicted by the first RENUMBER function.

Figure 56:
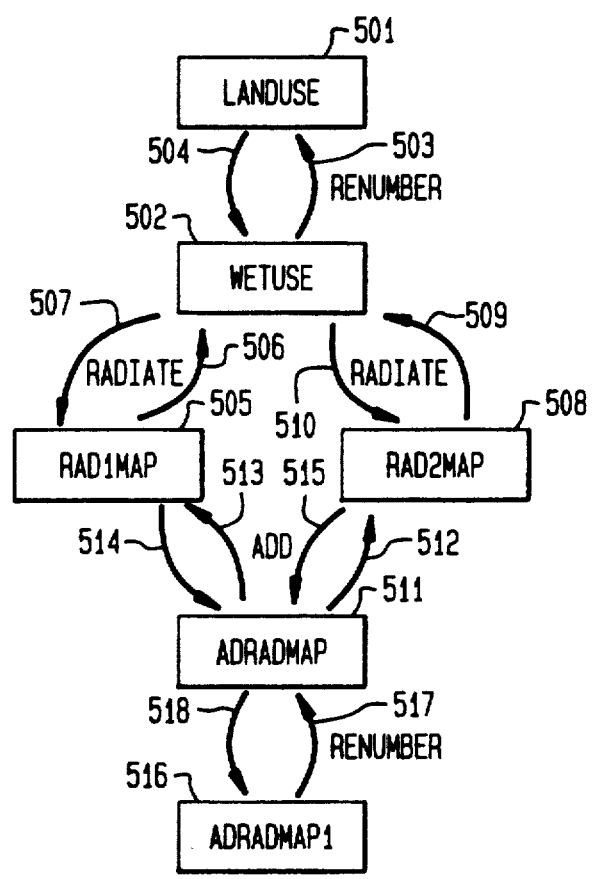
FIG. 56—Simplified Adapted Cartographic Model.

Referring to FIG. 56, the simplified adapted cartographic model of this application is presented. The LANDUSE map from USGS when initially input to the system would have a source description frame only [501]. It would also be represented in the semantic network as a separate node. When the WETUSE [502] map is created using the function RENUMBER, a node is created representing the WETUSE map. Additionally, a child link would be created pointing from the WETUSE map to the LANDUSE map designating WETUSE as a child of land use [503]. Further, a command frame would be created noding the commands and associated command modifiers that gave rise to the WETUSE map. In the same fashion, a parent link [504] is also created designating LANDUSE as the parent of WETUSE.

The function RADIATE is used to create RADIMAP [505]. During the creation of RADIMAP a CF is created noting the command and any command modifiers which gave rise to the RADIMAP and child link [506] is created designating RAD1MAP as a child of WETUSE and parent link [507] is created designating WETUSE as a parent of RAD1MAP.

In a similar fashion, a separate RADIATE command is used to create RAD2MAP [508]. As RAD2MAP is created, a CF is created along with a child link [509] designating RAD2MAP as a child of WETUSE and a parent link [510] designating WETUSE as a parent of RAD2MAP.

The user next applies the ADD function to add RADIMAP to RAD2MAP to create ADRADMAP. ADRADMAP [511] is therefore created and represented with a node in the semantic database and also is associated with a command frame noting the ADD command and any modifiers to it. ADRADMAP is also created with two child links designating ADRADMAP as a child of RAD2MAP [512] and a child of RAD1MAP [513]. In addition, RAD1MAP is given a parent link [514] associating it as the parent of ADRADMAP and RAD2MAP is given a parent link [515] designating it as a parent of ADRADMAP.

Lastly, the user desires to create the final product, ADRADMAP1 [516] which results from applying the function RENUMBER to ADRADMAP. Thus, ADRADMAP1 is represented by a node in the semantic network and a command frame noting the command RENUMBER was used for form ADRADMAP1 and any modifiers to that command. ADRADMAP1 also has a child link [517] designating it as a child of ADRADMAP and ADRADMAP is given a parent link [518] noting it as the parent of ADRADMAP1. In addition, ADRADMAP1 is given a 18 product frame, or PF, which designates the attributes of ADRADMAP1 in the event a user desires to pose a query to the LIP to determine the characteristics of ADRADMAP1.

The user can also request the LIP to create a final product or "export" any map desired. In such a case, the LIP will prompt the user to enter the appropriate attributes to complete a product frame. In this way a user can create in any final product desired. An example of the user interaction with the LIP to create a final product called "ECO_ZONES" is given in FIG. 57.

Once this adapted cartographic model and semantic network are in place, the LIP is in a position to answer the following questions:
Is LANDUSE a parent of ADRADMAP?
What is the lineage of ADRADMAP1?
What are the final products of LANDUSE?
Why is RAD2MAP a parent of ADRADMAP1?
What is RAD2MAP?

The questions posed by the user to the LIP and the LIP responses to these questions are provided in FIGS. 58-62.

Other Uses of the LIP

By using the LIP a number of tasks may be accomplished. A knowledge representation of the type just described is an automation of the adapted cartographic model. It serves as a formal representation of individual GIS layers and their input/output transformational relationships which can be examined systematically. From these relationships it is possible to perform a comparison of GIS application based algorithms.

Comparison of Algorithms

If two spatial data processing applications start with the same set of input layers and results in the same output layer, then such applications can be compared. If the LIP determines that there are distinct paths to the same output product, then comparisons can be made to determine which of the two GIS applications are more efficient in terms of computing time, space requirements and logical correctness of the transformation used to create the final end product. This would be possible if the CF (FIG. 3) was given a slot and associated value for CPU processing time related to the command in question and another slot and value for size of resulting layer. An algorithm comparison function would add the values from the CPU processing time slot and would also sum the values for the size of the resulting layers. The resulting two values would be used for the comparison of the algorithm in question. Thus, examinations can include a comparison of alternative algorithms for producing the same output product.

I claim:

1. A method of tracing lineage of at least one spatial data layer of a spatial information processing and database system comprising the steps of:
   a user operating a data processing means to establish in a computer having stored software modules capable of establishing and query a meta-database, a meta-database representing all the spatial data layers in said system,
   said user characterizing all of the spatial data layers in said system using frames, said frames comprising attributes which describe the said data layers,
   the said computer with software modules creating a semantic network among all layers present in said system,
   the said user identifying a spatial data layer about which information concerning lineage is desired,
   the said computer with software modules providing means to query said meta-database and means to supply answers to a received query, the said user posing at least one query concerning the lineage relationship of said identified spatial data layer to other layers of said system, and the said computer with software modules determining the lineage of said identified spatial data layer from the answer to said query.

2. A method according to claim 1 wherein said frames comprise source description frames comprising the attributes of the original input to said system, command frames comprising the attributes of the transformations applied to any particle spatial data layer, and product frames comprising the attributes of final output products from said system.

3. A method according to claim 2 wherein said semantic network comprises parent links pointing from each of the earlier formed spatial data layers to subsequently formed spatial data layers created at least in part from a spatial data layer to which it is linked by a parent link, child links pointing from each of the subsequently formed spatial data layers to an earlier formed spatial data layer used at least in part to create the subsequent spatial data layer, and nodes representing each of the spatial data layers in said system.

4. A method according to claim 3 wherein said computer with software modules comprise logic which automatically creates said semantic network.

5. A method according to claim 4 wherein said means to query the meta-database comprises logic which enables a user to pose one or more questions and receive answers concerning a spatial data layer's said attributes and lineage relationship to other layers.

6. A method according to claim 5 wherein said computer with software modules comprise logic allowing the said modules to accept rules created by a user, which rules use at least one of said attributes to programmably permit or deny the combination or transformation of said spatial data layers.

7. A method according to claim 6 further comprising the steps of:
   the said rule-based logic using said parent and child links, together with at least one of said attributes to determined whether different layers of said system can be combined,
   the said rule-based logic identifying a prohibited combination of two or more incompatible data layers, and
   the said rule-based logic informing a user when a the identified spatial data layer combination comprises incompatible data layers.

8. A method according to claim 7 further comprising the steps of
   a user creating rules for the combination of said spatial data layers whereby only data layers having compatible attributes can be combined, and
   the said rule-based logic not allowing the attempted combination of data layers having incompatible attributes.

9. A method according to claim 8 further comprising the step of:
   the rule-based logic identifying for a user the procedures necessary to enable combination of data layers having incompatible attributes.

10. A method according to claim 9 further comprising the steps of:
    a user creating rules for the translation of one transformation into a set of others,
    the said rule-based logic detecting when a user requests the combination of data layers having incompatible attributes,
    the said rule-based logic analyzing the attributes in the lineage information concerning the data layers desired to be combined,
    said rule-based logic automatically performing the appropriate transformation from one data layer to another to reconcile the incompatibility of the said attributes, and
    said rule-based logic proceeding with the requested combination of layers.

11. A method according to claim 10 which enables comparing the efficiency of processing spatial data layers by different routes further comprising the steps of:
    the said rule-based logic identifying identical input layers in a spatial database,
    the said rule-based logic identifying identical output layers,
    the said rule-based logic comparing the processing times and memory requirements of the steps by which the identical output layers were achieved, and
    the said rule-based logic providing an output of the results of the said comparison by which comparative efficiency of processing can be determined.

12. A method according to claim 11 wherein said method is part of a geographic information system.

13. A method according to claim 11 wherein said method is part of a digital image processing system.

14. An apparatus for tracing lineage of at least one spatial data layer of a spatial information processing and database system, wherein said apparatus allows a user to create, and to provide queries to, a meta-database of information concerning said system, the apparatus comprising:
    stored software modules capable of establishing and querying a meta-database,
    means for accepting commands, means for recognizing valid user commands means for creating a semantic network depicting the relationship among data layers in said system, means for integrating multiple spatial data applications, means for allowing a user to make queries to said meta-database concerning the lineage relationships stored in the meta-database semantic network, and means for providing answers to a user to enable a user to determine the lineage relationships stored in the meta-database semantic network from the answer to such queries.

15. An apparatus according to claim 14 wherein the semantic network creating means further comprises:

a first means for creating source description frames, describing the attributes of the original input to the spatial database, command frames describing the attributes of the transformations applied to any particular spatial data layer, and product frames describing the attributes of final output products from the spatial database system, a second means for creating parent links pointing from each of the earlier formed spatial data layers to subsequently formed spatial data layers created at least in part from a spatial data layer to which it is linked by a parent link, child links pointing from each of the subsequently formed spatial data layers to an earlier formed spatial data layer used at least in part to create the subsequent spatial data layer, and a third means for creating nodes representing each of the spatial data layers in said system.

16. An apparatus according to claim 15 which further comprises:

means for creation of rules by a user, which rules use said attribute information to programmably permit or deny the combination or transformation of said spatial data layers.

17. An apparatus according to claim 16 wherein said rule creation means further comprises:

first means for creating rules for the combination of data layers whereby only data layers having compatible attributes can be combined, and second means for creating rules for the combination of data layers whereby the attempted combination of data layers having incompatible attributes is not permitted.

18. An apparatus according to claim 17 wherein said rule creation means further comprises, third means for suggesting to a user the procedures necessary to allow combination of data layers having incompatible attributes.

19. An apparatus according to claim 18 wherein said rule creation means further comprises, fourth means for creating rules for the translation of one spatial data layer transformation into a set of others, fifth means for detecting when a user requests the combination of data layers having incompatible attributes, sixth means for analyzing the attributes in the lineage information concerning the data layers desired to be combined, seventh means for automatically performing the appropriate rule based transformation from one data layer to another to reconcile the incompatibility of the lineage attributes, and means for proceeding with the requested combination of layers.

20. An apparatus according to claim 19 for comparing the efficiency of processing spatial data layers by different routes further comprising:

means for identifying identical input layers in a spatial data processing database, means for identifying identical output layers and means for comparing the processing times and memory requirements of the steps necessary for each data processing application necessary to reach the identical output layers previously identified.

21. An apparatus according to claim 20 for the purpose of tracing lineage in a geographic information system.

22. An apparatus according to claim 20 for the purpose of tracing lineage in a digital image processing system.

* * * * *

UNITED STATES PATENT AND TRADEMARK OFFICE
CERTIFICATE OF CORRECTION

PATENT NO. : 5,193,185
DATED : Mar. 9, 1993
INVENTOR(S) : David Lanter

It is certified that error appears in the above-indentified patent and that said Letters Patent is hereby corrected as shown below:

On title page, item [56], under
References Cited
OTHER PUBLICATIONS
change,
Line 1, replace "Service" with -- Source --.
Line 2, replace "Septrum" with -- System --.
Line 8, replace "Decision" with -- Design --.
Line 9, replace "Geogrphic" with -- Geographic --.
Line 11, replace "Role" with -- Rule --.
Lines 14-15, replace "Pergramming" with -- Programming --.
Line 17, replace "Advance" with -- Advances --.
Line 20, replace "CAS" with -- CAD --.
Line 42, replace "Technical" with -- Temporal --.
Line 48, between "Role" and "Artificial", insert -- of --.
Line 58, replace "Data" with -- Dana --.

Signed and Sealed this

Third Day of December, 1996

Attest:

BRUCE LEHMAN

Attesting Officer     Commissioner of Patents and Trademarks